(12) United States Patent
Russell et al.

(10) Patent No.: US 10,736,070 B2
(45) Date of Patent: Aug. 4, 2020

(54) METHOD AND SYSTEM FOR USE OF A RELAY USER EQUIPMENT IN AN INTERNET PROTOCOL MULTIMEDIA SUBSYSTEM

(71) Applicant: BlackBerry Limited, Waterloo (CA)

(72) Inventors: Nicholas James Russell, Newbury (GB); Adrian Buckley, Tracy, CA (US); Stephen John Barrett, Haywards Heath (GB)

(73) Assignee: BlackBerry Limited, Ontario (CA)

( * ) Notice: Subject to any disclaimer, the term of this patent is extended or adjusted under 35 U.S.C. 154(b) by 0 days.

(21) Appl. No.: 15/660,749

(22) Filed: Jul. 26, 2017

(65) Prior Publication Data

US 2019/0037518 A1 Jan. 31, 2019

(51) Int. Cl.
| | |
|---|---|
| *H04W 40/22* | (2009.01) |
| *H04W 60/04* | (2009.01) |
| *H04L 29/06* | (2006.01) |
| *H04W 76/11* | (2018.01) |
| *H04W 8/24* | (2009.01) |
| *H04W 80/10* | (2009.01) |
| *H04W 88/04* | (2009.01) |

(52) U.S. Cl.
CPC ......... *H04W 60/04* (2013.01); *H04L 65/1016* (2013.01); *H04L 65/1073* (2013.01); *H04W 8/24* (2013.01); *H04W 76/11* (2018.02); *H04W 80/10* (2013.01); *H04W 88/04* (2013.01)

(58) Field of Classification Search
None
See application file for complete search history.

(56) References Cited

U.S. PATENT DOCUMENTS

| | | | | |
|---|---|---|---|---|
| 9,538,491 | B2 | 1/2017 | Kiss | |
| 10,148,340 | B1 * | 12/2018 | Bales | H04W 76/10 |
| 2008/0125114 | A1 * | 5/2008 | Dorenbosch | H04W 8/04 |
| | | | | 455/433 |
| 2008/0256251 | A1 * | 10/2008 | Huotari | H04L 67/16 |
| | | | | 709/229 |
| 2011/0064205 | A1 * | 3/2011 | Boni | H04M 11/04 |
| | | | | 379/45 |

(Continued)

FOREIGN PATENT DOCUMENTS

| | | |
|---|---|---|
| EP | 1841146 | 10/2007 |
| WO | 2017082955 | 5/2017 |

OTHER PUBLICATIONS

IEEE 1609.12, "Standard for Vehicular Environments (WAVE)—Identifier Allocations", 2016.

(Continued)

*Primary Examiner* — Brandon M Renner
(74) *Attorney, Agent, or Firm* — Fish & Richardson P.C.

(57) ABSTRACT

A method for Internet Protocol (IP) Multimedia Subsystem (IMS) communication registration through a relay user equipment, the method including: receiving, at the relay user equipment from a remote user equipment, an association message, the association message containing a remote user equipment identifier; and responsive to the receiving, performing a registration from the relay user equipment with a network node, the registration including an association between the remote user equipment and the relay user equipment.

21 Claims, 18 Drawing Sheets

(56) References Cited

U.S. PATENT DOCUMENTS

| | | | |
|---|---|---|---|
| 2013/0170386 A1* | 7/2013 | Gonzalez De Langarica | .............. H04L 41/12 370/252 |
| 2014/0106709 A1* | 4/2014 | Palamara | ................ H04W 8/18 455/411 |
| 2015/0043429 A1 | 2/2015 | Kim et al. | |
| 2015/0201179 A1* | 7/2015 | Bouazizi | ............. H04L 65/4092 348/43 |
| 2016/0323777 A1* | 11/2016 | Pan | ......................... H04W 4/02 |
| 2017/0041752 A1* | 2/2017 | Baek | ...................... H04W 4/023 |
| 2018/0199301 A1* | 7/2018 | Hori | ........................ H04W 4/10 |
| 2018/0234465 A1* | 8/2018 | Kim | .................... H04L 65/1006 |
| 2018/0324875 A1* | 11/2018 | Kim | ........................ H04W 8/02 |
| 2019/0239147 A1* | 8/2019 | Chun | .................... H04W 88/06 |

OTHER PUBLICATIONS

3GPP TS 23.002 v.14.1.0, "Network Architecture", Mar. 13, 2017.
3GPP TS 23.003 v.15.0.0, "Numbering, addressing and identification", Jun. 19, 2017.
Tutorialspoint, "SIP Session Description Protocol", https://web.archive.org/web/20170324161551/http://www.tutorialspoint.com/session_initiation_protocol/session_initiation_protocol_sdp.htm, accessed on Mar. 24, 2017.
3GPP TS 23.060 v.14.4.0, "General Packet Radio Service (GPRS); Service Description; Stage 2", Jun. 12, 2017.
3GPP TS 23.203 v.14.4.0, "Policy and charging control architectures", Jun. 12, 2017.
3GPP TS 23.401 v.15.0.0, "General Packet Radio Service (GPRS) enhancements for Evolved Universal Terrestrial Radio Access Network (E-UTRAN) access", Jun. 12, 2017.
3GPP TS 23.228 v.14.4.0, "IP Multimedia Subsystem (IMS); Stage 2", Jun. 12, 2017.
3GPP TS 23.303 v.15.0.0, "Group Services and System Aspects; Proximity-based services (ProSe); Stage 2", Jun. 12, 2017.
3GPP TS 23.285 v.14.3.0, "Architecture enhancements for V2X services", Jun. 12, 2017.
3GPP TS 24.229 v.14.4.0, "IP multimedia call control protocol based on Session Initiated Protocol", Jun. 16, 2017.
3GPP TS 33.203 v.14.0.0, "3G security; Access security for IP-based services", Mar. 27, 2017.
3GPP TS 33.303 v.14.1.0, "Proximity-based Services (ProSe); Security aspects", Jun. 14, 2017.
3GPP TS 29.229 v.14.1.0, "Cx and Dx interfaces based on the Diameter protocol", Mar. 16, 2017.
3GPP TS 36.321 v.14.2.1, "Evolved Universal Terrestrial Radio Access (E-UTRA); Medium Access Control (MAC) protocol specification"; Apr. 27, 2017.
3GPP TS 31.102 v.14.2.0, "Characteristics of the Universal Subscriber Identity Module (USIM) application", Mar. 17, 2017.
3GPP TS 29.002 v.14.3.0, "Mobile Application Part (MAP) specification"; Mar. 15, 2017.
3GPP TS 29.272 v.14.3.0, "Evolved Packet System (EPS); Mobility Management Entity (MME) and Serving GPRS Support Node (SGSN) related interfaces based on Diameter protocol", Mar. 15, 2017.
3GPP TS 36.300 v.14.3.0, "Evolved Universal Terrestrial Radio Access (E-UTRA) and Evolved Universal Terrestrial Radio Access Network (E-UTRAN); Overall description; Stage 2", Jun. 23, 2017.
GSMA PRD IR.92, "IMS Profile for Voice and SMS Version 9.0", Apr. 8, 2015.
GSMA PRD IR.88, "LTE and EPC Roaming Guidelines Version 15.0", Nov. 3, 2016.
GSMA PRD RCC.07, "RSC Common Core Service Description Document Version 1.0", Sep. 16, 2014.
IETF RFC 3264, "An Offer/Answer Model with the Session Description Protocol (SDP)", Jun. 2002.
IETF RFC 5766, "Traversal Using Relays around NAT (TURN): Relay Extensions to Session Traversal Utilities for NAT (STUN)", Apr. 2010.
IETF RFC 5245, "Interactive Connectivity Establishment (ICE): A Protocol for Network Address Translator (NAT) Traversal for Offer/Answer Protocols", Apr. 2010.
IETF RFC 3261, "SIP: Session Initiation Protocol", Jun. 2002.
ETSI TS 102 965 V1.3.1, "Intelligent Transport Systems (ITS); Application Object Identifier (ITS-AID); Registration", Nov. 2016.
ETSI TS 102 894-2 V1.2.1, "Intelligent Transport Systems (ITS); Users and applications requirements; Part 2: Applications and facilities layer common data dictionary", Sep. 2014.
IETF RFC 5389, "Session Traversal Utilities for NAT (STUN)", Oct. 2008.
ISO/TS 17419:2014, "Intelligent transport systems—Cooperative systems—Classification and management of ITS applications in a global context", Apr. 2014.
International Search Report arid Written Opinion of the International Searching Authority issued in international Application No. PCT/US2018/043266 dated Oct. 22, 2018; 12 pages.

\* cited by examiner

US 10,736,070 B2

METHOD AND SYSTEM FOR USE OF A RELAY USER EQUIPMENT IN AN INTERNET PROTOCOL MULTIMEDIA SUBSYSTEM

FIELD OF THE DISCLOSURE

The present disclosure relates to methods and systems for providing connectivity through a relay user equipment for Internet Protocol (IP) Multimedia Subsystem (IMS) services.

BACKGROUND

In many situations, multiple user equipments (UEs) may be co-located within a small area. For example, in a vehicle, the vehicle itself may have a first UE, and various passengers within the vehicle may have a plurality of other UEs.

A first UE, for example a vehicle's UE, may have a better data connection with a network than portable user equipments. For example, the vehicle's UE may have a roof mounted antenna, which allows for better signal reception than the vehicle's passengers' UEs.

Further, in many situations, each of the UEs in the small area may have a separate or different IMS/Session Initiation Protocol (SIP) service provider. Such UEs may also each have a different Home Public Land Mobile Network (HPLMN) and may be associated with different Visited or Registered Public Land Mobile Network (VPLMN or RPLMN, respectively).

BRIEF DESCRIPTION OF THE DRAWINGS

The present disclosure will be better understood with reference to the drawings, in which.

DETAILED DESCRIPTION OF THE DRAWINGS

Figure 1:
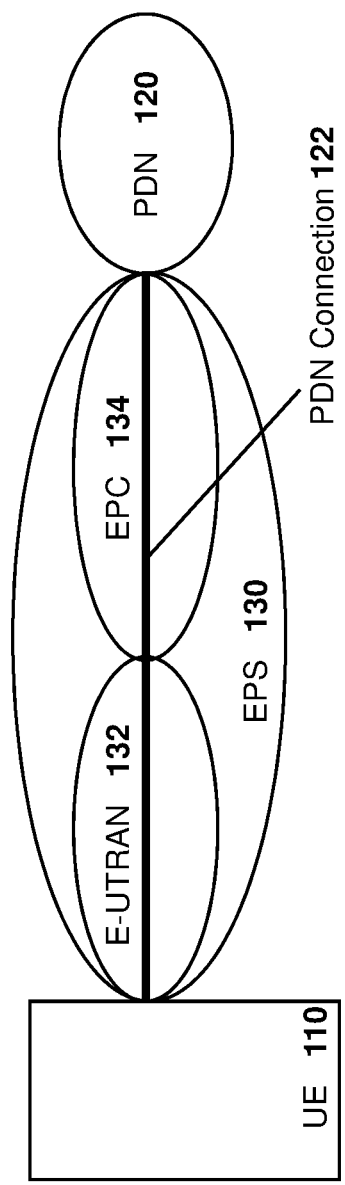
FIG. 1 is a block diagram showing a packet data network connection between a user equipment and a packet data network.

The present disclosure provides a method for Internet Protocol (IP) Multimedia Subsystem (IMS) communication registration through a relay user equipment, the method comprising: receiving, at the relay user equipment from a remote user equipment, an association message, the association message containing a remote user equipment identifier; and responsive to the receiving, performing a registration from the relay user equipment with a network node, the registration including an association between the remote user equipment and the relay user equipment.

The present disclosure further provides a relay user equipment for Internet Protocol (IP) Multimedia Subsystem (IMS) communication registration, the relay user equipment comprising: a processor; and a communications subsystem, wherein the relay user equipment is configured to: receive, from a remote user equipment, an association message, the association message containing a remote user equipment identifier; and responsive to receiving the association message, perform a registration from the relay user equipment with a network node, the registration including an association between the remote user equipment and the relay user equipment.

The present disclosure further provides a computer readable medium for storing instruction code, which when executed by a processor of a relay user equipment for Internet Protocol (IP) Multimedia Subsystem (IMS) communication registration cause the relay user equipment to: receive, from a remote user equipment, an association message, the association message containing a remote user equipment identifier; and responsive to receiving the association message, perform a registration from the relay user equipment with a network node, the registration including an association between the remote user equipment and the relay user equipment.

In situations where a plurality of UEs are in proximity to each other, one UE may have a better coverage than the other UEs. As indicated above, this may be due to the configuration of the antenna of the user equipment, the location of user equipment or other factors. Therefore, in accordance with the embodiments of the present disclosure, methods and systems are provided to allow the sharing of a first UE's data connection for IMS/SIP based services to other UEs, where the other UEs have a separate or different IMS/SIP service provider to that of the first UE. Further in some cases the UEs may have different HPLMNs than the first UE and/or may have different RPLMNs or VPLMNs than the first UE.

Further, in accordance with other embodiments of the present disclosure, methods and systems are provided for routing incoming and outgoing calls and/or sessions so that they can be serviced by one of a plurality of different UEs. Options include being serviced by the first UE, by another device associated with the first UE (for example an infotainment system), or with other UEs that either originated the call or session or were targeted for the call or session.

The present disclosure is described below with regard to a vehicle system in which a first UE belongs to a vehicle and other UEs belong to either passengers in the vehicle or may be associated with other vehicle subsystems. However, such embodiments are provided for illustration purposes only and in other cases, a plurality of user equipments may be in proximity with each other and may utilize the techniques described herein. The present disclosure is therefore not limited to a vehicle embodiment.

Further, in the Figures below, communication flows are shown between functions. However, those skilled in the art will appreciate that the communication flows may in some cases proceed through intermediate entitles or logical functions that are not shown.

In the present disclosure, the following terms have at least the meaning provided in Table 1 below.

TABLE 1

Term Definitions

| Term | Definition |
|---|---|
| Local Connection | Wired or Wireless (see WAN connections for examples), Bluetooth, 802.11 based technologies |
| Application Server ID | FQDN, URN, IP address, User Identity. Is the address of AS1, IMS Call collision handling App Server |
| Call Collision Application Server | Also an Application server, AS1 etc. |
| Local Connection ID | e.g. a MAC address, an IP address, a serial number, an IMEI, PC5 Layer 2 address, etc. |
| Public User ID | Could be but not limited to: an MSISDN, email address, SIP URI, Tel URI, NAI The property of this identity is that it is known to the public. |
| Private user ID | IMSI, SIP URI, NAI The property of this identity is that it is only known to the network and the device., |
| User Identity/User ID | Can be either or both Public User ID and Private user ID. The identity could be wild carded |
| $1^{st}$ REGISTRATION | The creation of an association between a Remote UE and a Relay UE. It may be a SIP REGISTRATION or a form of association e.g. Bluetooth or 802.11 STA with an 802.11 AP. |
| Relay UE S-CSCF | A $1^{st}$ S-CSCF |
| Remote UE S-CSCF | A $2^{nd}$ S-CSCF |
| Address | FQDN, URN, URL, SIP URI, Tel URI |

Data Connectivity

A UE wishing to use cellular data connectivity or services may make use of at least one Evolved-Universal Mobile Telephony System (UMTS) Terrestrial Radio Access Network (E-UTRAN), Enhanced Packet Core (EPC) and a Packet Data Network (PDN). The combination of an E-UTRAN and an EPC is known as an enhanced packet system (EPS). For a 5G system, this comprises of one or both of a Next Generation (NG) radio and NG core network.

Reference is now made to FIG. 1. In the example of FIG. 1, UE 110 connects with a PDN 120 utilizing a PDN connection 122. Such PDN connections may, in some embodiments, be referred to as packet data protocol (PDP) contexts in second generation (2G) or third generation (3G) networks, or referred to as Packet Data Unit (PDU) sessions in fifth generation (5G) networks. PDN connection 122 may be used to transmit and receive data such as signaling or control plane data, user plane data, voice/audio media, video media among other data options, between the UE 110 and PDN 120. A PDN provides a mechanism for a UE to communicate and send data.

PDN connection 122 is typically over an E-UTRAN 132 and EPC 134, as provided in FIG. 1. However, in other embodiments the connectivity may be over a wireless local area network (WLAN) and an EPC, and the present disclosure is not limited to a particular PDN connection 122.

The E-UTRAN 132 and EPC 134 typically, but not always, belong to a mobile network operator or cellular carrier, whereas the PDN 120 may belong to an operator or other entity. For example, the PDN may belong to a corporation or an enterprise network.

EPS 130 may consist of only an HPLMN ($1^{st}$ service provider) or may further consist of HPLMN and a Visiting Public Land Mobile Network (VPLMN) ($2^{nd}$ service provider), with the latter being used for roaming. Such HPLMN and VPLMN are not shown in FIG. 1 for brevity.

EPS 130 may consist of various entities. These include one or more of an enhanced Node B (eNB), Mobile Management Entity (MME) Serving Gateway (S-GW), PDN Gateway (P-GW], or Home Subscriber Server (HSS), among other network nodes.

PDN connection 122 provides a path for data between a UE 110 and a PDN 120. During PDN connection establishment, the PDN 120 is identified by an access point name (APN), and thereafter by other parameters in the established PDN connection. The APN can identify a gateway node (e.g. P-GW, a Gateway General Packet Radio Service (GPRS) Support Node (GGSN), among others, in the EPC 134 that allows access to the PDN 120.

As defined in the $3^{rd}$ Generation Partnership Project (3GPP) Technical Specification (TS) 23.003, "Numbering, addressing and identification", as for example provided in v.14.3.0, March 2017, an APN consists of a network identity (NI) and an operator identity (OI) portion. Both the NI and OI portions consist of a string of characters separated by dots. The characters in between the dots are referred to as "labels".

In one embodiment, the content of the NI portion may be undefined, whereas the content of the OI portion is strictly defined. The OI portion is generally appended by the network to the end of an NI. Network nodes that may perform this function include, but are not limited to, the Serving GPRS Support Node (SGSN), MME, S-GW, P-GW, among others.

In other embodiments, the UE may provide both the NI and OI if the UE wishes to specifically request breakout to a PDN in a specific Public Land Mobile Network (PLMN) and in the absence of the OI being provided by the UE, the network uses defined logic to decide the OI to append to the NI. Such defined logic, for example, may be found in 3GPP TS 23.060, "General Packet Radio Service (GPRS); Service description; Stage 2", as for example provided in v.14.4.0, June 2017.

A UE is roaming when it is not attached to a PLMN that is its home PLMN or an Extended HPLMN (EHPLMN). When the UE is roaming, a PDN connection may connect to a PDN in the VPLMN or HPLMN. A connection to a PDN in the VPLMN is sometimes referred to as "local break-out" (LBO). A connection to a PDN in the HPLMN is sometimes referred to as "home routed" or S8 Interface Home Routed ("S8HR").

A UE may have more than one PDN connection if the UE needs to connect to more than one PDN. A PDN connection consists of one or more EPS bearers, which may be referred to simply as "bearers", for the data to be transmitted and received between the UE and the network. One EPS bearer within a PDN connection is considered the "default bearer" or "default EPS bearer" and is usually the one created at the time of PDN connection establishment. The rest of the EPS bearers besides the default EPS bearer are known as "dedicated EPS bearers" or simply "dedicated bearers" and are used to provide a different Quality of Service (QoS) for data from the default EPS bearers.

Each EPS bearer has a QoS Class Identifier (QCI). A full list of QCIs can be found, for example, in subclause 6.1.7.2 of 3GPP TS 23.203, "Policy and charging control architecture", as for example provided in v.14.4.0, June 2017. Besides the QCI, other information such as a traffic flow template may be used to decide which data goes over which EPS bearer in some embodiments.

In some embodiments, a UE may be configured, preconfigured or provisioned with APNs for different services, features or functions. In other embodiments, a "well known" APN may be used in addition to such provisioned APNs or instead of provisioned APNs. A well-known APN is an APN whose value is standardized or specified to be a specific value. An example of a well-known APN is the "IMS well-known APN", also referred to in some documents as the "IMS APN". Some IMS based services deployed by HPLMNs make use of the APN connection to an IMS well-known APN.

The details of the IMS well-known APN are defined, for example, in the Global System for Mobile communications (GSM) Association (GSMA) Permanent Reference Document (PRD) IR.88, "LTE Roaming Guidelines", v. 9.0, January 2013. Essentially, the IMS well-known APN has a value of "IMS" and is used by services such as Voice over Long Term Evolution (VoLTE), as for example defined in GSMA PRD IR.92, "IMS Profile for Voice and SMS", as for example provided in v. 9.0, April 2015, and in Rich Communication Services (RCS), as for example defined in GSMA PRD RCC.07, "Rich Communication Suite 5.3 Advanced Communications Services and Client Specification", as for example provided in v. 6.0, February 2015, among others.

The UE establishes a PDN connection to the IMS well-known APN, ensuring that the default EPS bearer for this PDN connection has a specific QCI value of "5", which is appropriate for signaling messages as defined in 3GPP TS 23.401, "General Packet Radio Service (GPRS) enhancements for Evolved Universal Terrestrial Radio Access Network (E-UTRAN) access", as for example provided in v.15.0.0, June 2017, and in 3GPP TS 23.203. The UE may then establish one or more dedicated EPS bearers for voice/audio and video media on an as needed basis, with QCI values of one and two respectively. A PDN connection to the IMS well-known APN may be referred to as an IMS PDN connection.

Despite the value of the IMS well-known APN being standardized, the IMS PDN connection provides a connection to a PDN in either the UE's HPLMN or the UE's VPLMN. That is, the PDN that is connected to by one UE may differ to another UE if the other UE has different HPLMN and/or is attached to a different PLMN which may be dependent on whether the UE is roaming. For example, the UEs may have different Subscriber Identity Modules (SIMs), Universal Subscriber Identity Modules (USIMs) or IMS Subscriber Identity Modules (ISIMs).

IMS

Figure 2:
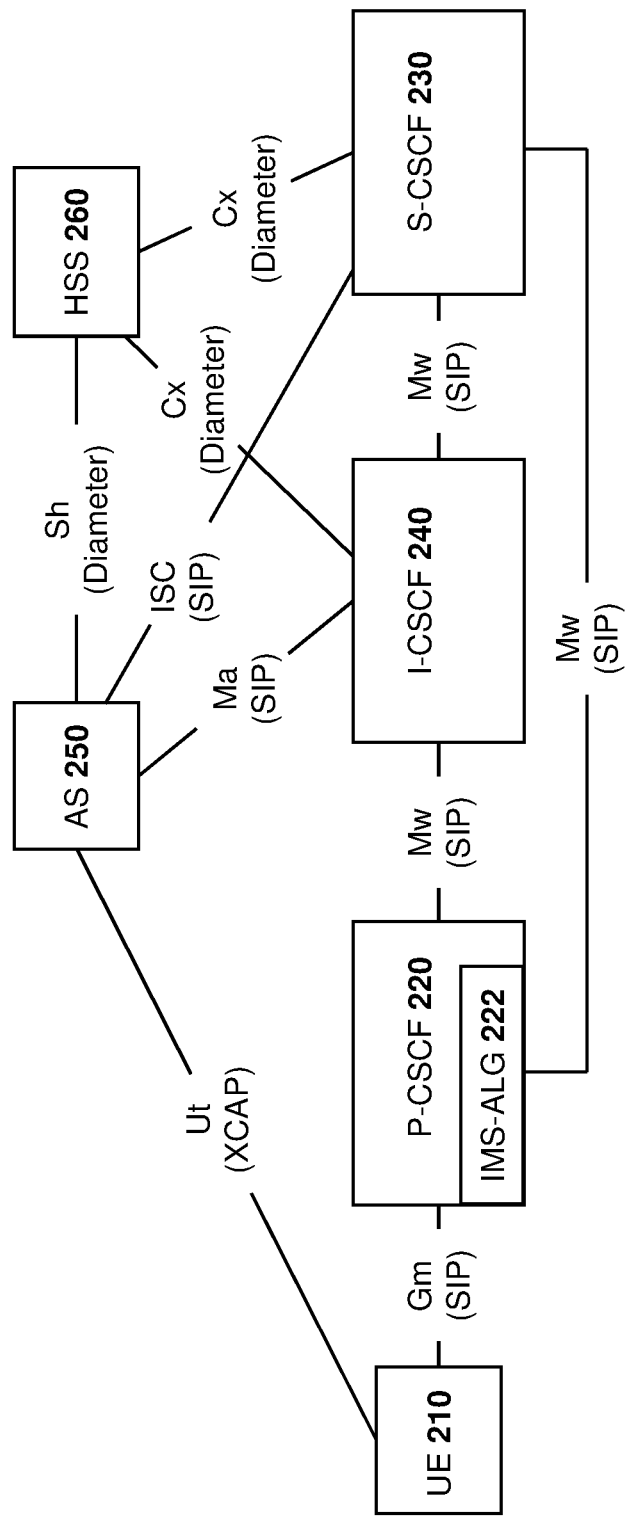
FIG. 2 is a block diagram showing internet protocol multimedia subsystem components within a fourth generation network.

Reference is now made to FIG. 2, which shows an overview of an IP multimedia (core network) subsystem. An IMS network can, but need not, be attached to a fourth-generation (4G) network or a fifth-generation (5G) network, and may consist of a number of functional elements, a subset of which are described with regard to FIG. 2.

In particular, UE 210 may communicate with a Proxy-Call Session Control Function (P-CSCF) 220. P-CSCF 220 is the first point of entry into the IMS network. The P-CSCF 220 may include an IMS Application Level Gateway (IMS-ALG) 222.

Communications between UE 210 and P-CSCF 220 is done utilizing a Gm interface, which is used to exchange messages between SIP UEs or Voice Over Internet Protocol (VOIP) gateways and the P-CSCF 220. Messages are exchanged utilizing a SIP protocol.

A Serving-Call Session Control Function (S-CSCF) 230 handles sessions in the network and routes SIP messages to appropriate IMS application servers (AS) and P-CSCFs. S-CSCF 230 communicates with the P-CSCF using an Mw interface, which is used to exchange messages between CSCFs. Messages are exchanged utilizing a SIP protocol.

An Interrogating-Call Session Control Function (I-CSCF) 240 is used as an entry point to find a subscriber in the network and assist in assigning an S-CSCF 230 when a subscriber registers in the network. I-CSCF 240 communicates with both the P-CSCF 220 and the S-CSCF 230 utilizing an Mw interface and the SIP protocol.

AS 250 typically provides service specific functionality. An example of an AS may include a telephony application server, which is typically used to provide service logic and control for telephony services such as voice/audio or video. Another example of an AS may be a service centralization and continuity AS, which is typically used to provide service logic and control for centralizing services between circuit-switched (CS) and IMS in the IMS and handing over of SIP sessions and their associated media between UEs and/or across different IP networks.

In one embodiment, AS 250 may be the IMS application server. Such IMS application server has the logic and software that executes services for an IMS subscriber. There may be 0 to many such application servers in a network.

AS 250 communicates with UE 210 utilizing a Ut interface over an eXtensible Markup Language (XML) Configuration Access (XCAP) protocol. AS 250 further communicates with I-CSCF 240 over an Ma interface using a SIP protocol. AS 250 further communicates with the S-CSCF 230 using the ISC interface and a SIP protocol.

The Home Subscriber Server (HSS) 260 is a $1^{st}$ database that contains the subscriber profile, including identities and what services have been subscribed to, and provides location functionality as well as an authentication database ($2^{nd}$ database). HSS 260 communicates with the I-CSCF 240 utilizing a Cx interface and the diameter protocol. Similarly, HSS 260 communicates with the S-CSCF 230 utilizing the Cx interface and the diameter protocol. Note that from an implementation perspective, these two databases may be one or two physical entities.

HSS 260 further communicates with AS 250 utilizing the Sh interface and the Diameter protocol.

A more complete description of the functionality of the elements above can be found in the 3GPP TS 23.002, "Network Architecture", as for example provided in v. 14.1.0, March 2017, and TS 23.228, "IP Multimedia Subsystem (IMS); Stage 2", as for example provided in v. 14.4.0, June 2017.

An IMS registration is needed in order for a subscriber and their UE to be able to use the IMS based services. An IMS registration procedure is described, for example, in 3GPP TS 23.228. Specifically, subclause 5.2.2.3 provides for IMS registration and is described below with regard to FIG. 3.

Figure 3:
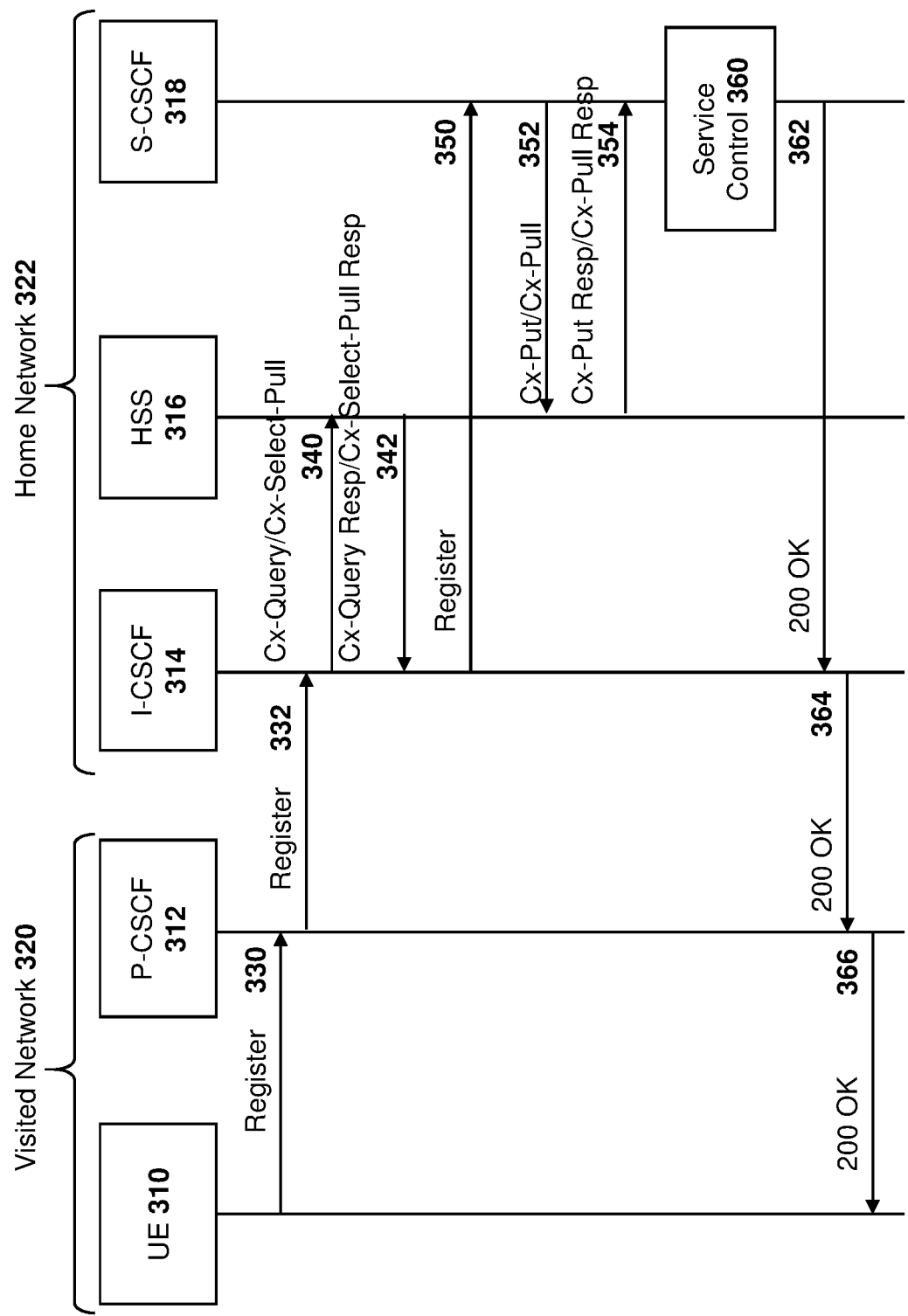
FIG. 3 is a dataflow diagram showing a simplified IMS registration.

As seen in FIG. 3, UE 310 is in a visited network 320. UE 310 communicates with the P-CSCF 312 of the visited network 320.

Further, a home network 322 includes I-CSCF 314 as well as HSS 316 and S-CSCF 318.

The registration procedure includes the UE 310 sending a register message 330 to P-CSCF 312. The registration message is then forwarded in message 332 to the I-CSCF 314.

Based on received message 332, I-CSCF 314 sends a CX-query/CX-select-pull message 340 to HSS 316 and receives, in response, a CX-query/RESP/CX-select-pull RESP message 342.

Based on message 342, I-CSCF 314 may send a registration message 350 to the S-CSCF 318.

The S-CSCF 318, in response to message 350, sends a CX-put/CX-pull message 352 to HSS 316 and receives, in response to message 352, a CX-put RESP/CX-pull RESP message 354.

S-CSCF 318 may then perform service control (e.g. contact application servers), as shown at block 360, and provide a "200 OK" message 362 back to I-CSCF 314.

I-CSCF 314 then forwards the 200 OK message to the P-CSCF 312 as message 364. P-CSCF 312 then forwards the 200 OK message as message 366 back to UE 310. The 200 OK message 366 indicates to UE 310 that it has successfully registered for IMS services.

Once the UE 310 has registered with the network, it is then able to receive and send further SIP requests/messages. SIP requests include a SIP method which can be, but are not limited to, those described in Table 2 below.

TABLE 2

Example SIP Methods

| SIP Method | Purpose |
|---|---|
| INVITE | Establishes a session |
| MESSAGE | Transports Instant Messages |
| REFER | Requests the recipient to send the SIP Request identified by the REFER (by default an INVITE). A use for REFER is to initiate a call transfer |
| REGISTER | Communicates user location (username/address of record, IP address in order to create a binding between them in the network for routing of SIP requests targeted at the username/address of record) |
| OPTIONS | Communicates information about the capabilities of the calling and receiving SIP phones |

SIP requests may consist of headers, parameters associated with headers, and a body.

Within some SIP requests, another protocol may be included within the body called the Session Description Protocol (SDP). The purpose of SDP is to convey information about media streams and multimedia sessions to help participants join or gather information for a particular session.

The Internet Engineering Task Force (IETF) Request For Comments (RFC) 3264, *"An Offer/Answer Model with the Session Description Protocol (SDP)"*, June 2002, defines an SDP offer/answer mechanism. Such mechanism allows two entities to make use of SDP to arrive at a common view of a multimedia session. In the model, one participant offers the other a description of the desired session from their perspective and the other participant answers with the desired session from their perspective. This offer/answer model is most useful in unicast sessions where information from both participants is needed for the complete view of the session. The offer/answer model is used with SIP/SDP.

SDP allows a tentative participant to check information and decide whether to join a session. Further the information allows a participant to determine how and when to join a session.

The format of entries in SDP is in the form of <type>=<value>, where <type> defines a unique parameter and <value> provides a value for the parameter. There can be multiple instances of a particular parameter.

Session description parameters include "v", which provides a protocol version, "o", which denotes the owner/creator and session identifier, and "c", which denotes connection information. The "c" field may provide network type such as the Internet, an address type such as IP version 4 (IPv4) or IP version 6 (IPv6), and/or a connection address, which is the IP address or host that will be sending the media packets.

STUN and TURN

The presence of a network address translator (NAT) function, which may be co-located with a firewall function, enhances the security of a network by obscuring the IP addresses of nodes on a network, thus preventing the nodes from being directly reachable from other nodes outside of the network. However, this feature also causes some issues in real-time communications because nodes on the network cannot directly receive incoming calls, sessions, communications, dialogues, and/or transactions.

Combinations of various methods may overcome the hindrance caused by a NAT/firewall. For example, a combination of a Session Traversal Utilities for NAT (STUN), Traversal Using Relays around NAT (TURN) and Interactive Conductivity Establishment (ICE) can be used to provide a solution for real-time communications. Each is described below.

STUN provides a way for client software on an IP node to learn its assigned address and port on the NAT observed from other networks outside of its network. For example, IP nodes on the other side of the NAT may learn the assigned address and port on the NAT. Due to the varieties and complexity of NAT/firewall functions, STUN itself is not enough to allow incoming traffic to traverse the NAT.

TURN introduces a "man-in-the-middle" type server that relays, proxies or transfers the IP data traffic on behalf of a client behind a NAT, thus allowing that client to be reachable from the other side of the NAT. A TURN server relays the traffic between the two communicating points. Specifically, the TURN protocol is defined in the IETF RFC 5766, *"Traversal Using Relays around NAT (TURN): Relay Extensions to Session Traversal Utilities for NAT (STUN)"*, April 2010. TURN protocol is an extension of STUN, and most TURN messages have the same formatting as their STUN equivalents.

According to Section 1 of the IETF RFC 5766, "The [TURN] client can arrange for the server to relay packets to and from certain other hosts (called peers) and can control aspects of how the relaying is done. The client does this by obtaining an IP address and port on the server, called the relayed transport address. When a peer sends a packet on the relayed transport address, the server relays the packet to the client. When the client sends a data package to the server, the server relays it to the appropriate peer using the relayed transport address as the source."

ICE is defined in IETF RFC 5245, *"Connectivity Establishment (ICE): A Protocol for Network Address Translator (NAT) Traversal for Offer/Answer Protocols"*, April 2010. This specification provides techniques for how STUN and TURN can be used with SIP and SDP to establish sessions when a NAT is used between SIP endpoints. ICE enhances SDP to provide a means to communicate to the candidate IP address discovered using STUN and TURN and negotiate between user agents (UAs) a candidate pair of IP addresses which can be used for exchange of media. An example of ICE using STUN and TURN for establishing a session using SIP/SDP via NAT is shown with regards to FIG. 4.

Figure 4:
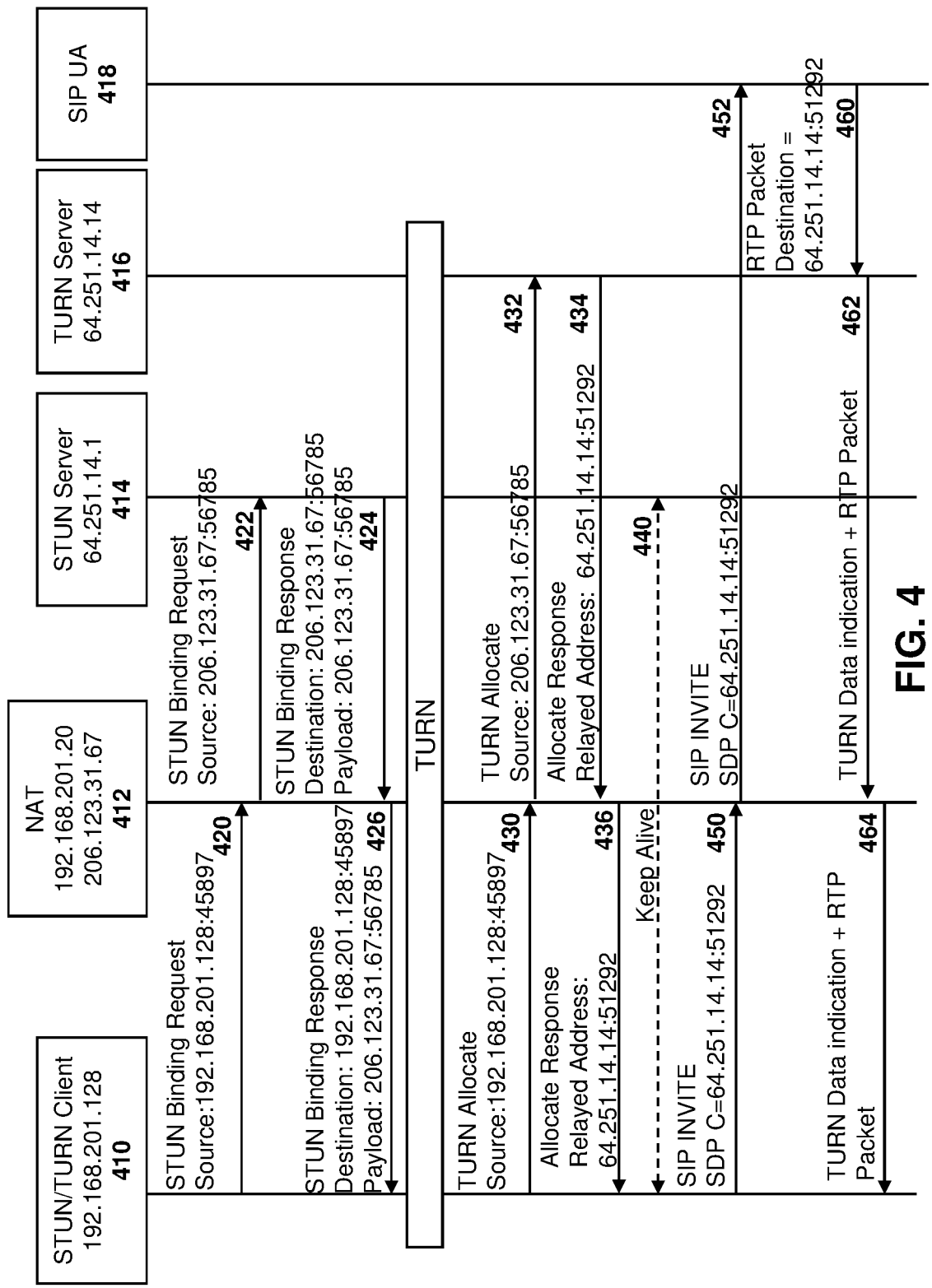
FIG. 4 is a dataflow diagram showing Interactive Connectivity Establishment using Section Traversal Utilities for Network Address Translator (NAT) (STUN) and Traversal Using Relays around NAT (TURN)

Referring to FIG. 4, a STUN/TURN client 410 has an address of 192.168.201.128. Further, a NAT 412 has an internally facing address of 192.168.201.20 and an externally facing address of 206.123.31.67.

A STUN server 414 has an address of 64.251.14.1. A TURN server 416 has an address of 64.251.14.14.

Further, a SIP UA 418 is the entity providing SIP services.

In message 420, the STUN/TURN client 410 sends a STUN binding request with its source address, along with a port, to NAT 412. NAT 412 receives message 420 and forwards the message to STUN server 414 in message 422. Message 422 has the source as the externally facing NAT address, along with an assigned port.

In response to message 422, STUN server 414 sends a STUN binding response message 424 in which both the destination and payload are the externally facing NAT address and port.

Based on stored bindings, the NAT 412 then forwards message 424 to the STUN/TURN client 410, shown as message 426. Message 426 replaces the destination with the destination of the STUN/TURN client 410 but leaves the payload as the externally facing NAT address and port.

Subsequently, TURN messages are exchanged. In particular, in message 430, the STUN/TURN client 410 sends a TURN allocate message to the NAT 412 with its address and port.

NAT 412 then forwards the TURN allocate message to TURN server 416. The message is forwarded as message 432 and includes the source as the address and port number of the NAT. The port is allocated for the particular STUN/TURN client.

In response to receiving message 432, TURN server 416 sends an allocate response message 434 back to NAT 412. The relayed address is set to the address of TURN server in message 434.

NAT 412 then forwards the allocate response message, with the received relayed address and port, to the STUN/TURN client 410, as shown by message 436.

Subsequently, keep alive messages 440 may be sent between the STUN server 414 and the STUN/TURN client 410 until a SIP session is required.

As shown at message 450, STUN/TURN client 410 sends a SIP Invite to the NAT 412. The SIP Invite includes in the SDP the address of the TURN server along with the port that was allocated.

NAT 412 forwards the SIP Invite method to the SIP UA 418 and includes the address of the TURN server in the SDP message.

The SIP UA 418 then forwards the RTP packet with the destination set to the TURN server 416, shown by message 460.

TURN server 416 then forwards the TURN data indication in RTP packet to NAT 412 in message 462. NAT 412 then forwards the message to the STUN/TURN client 410 as shown by message 464 in the embodiment of FIG. 4.

Using the embodiment of FIG. 4, a SIP session can be established for a client behind a NAT.

ProSe Relay UE—"UE to Network Relay"

Proximity Services (ProSe), as for example provided in 3GPP TS 23.303, *"Proximity-based services (ProSe); Stage 2"*, as for example provided in v.15.0.0, June 2017, define a set of features whereby a first UE can discover other UEs when the first UE (e.g. Remote UE) does not have cellular coverage e.g. E-UTRAN coverage. In order to achieve this, the first UE is provisioned with a set of radio parameters that allows the first UE to perform sidelink/PC5/PC5 sidelink Device to Device (D2D) communications, which is basically how a first UE can communicate with another UE. This first UE then either broadcasts on a frequency, using these radio parameters to configure the radio, or listens, which helps the first UE find another UE with whom to communicate. The other UE with which the first UE may communicate may be called a "UE to network relay". A "UE to network relay" is a UE that has a connection to an E-UTRAN and one or more other UEs, and that may also relay traffic between the connected E-UTRAN and the one or more of the other UEs. A "UE to network relay" may also be known as a relay UE. A relay UE may also be described as a function that is receiving and sending communications via a 1st radio access technology (RAT) and sending/forwarding and receiving those or a subset of those communications via a second RAT, wherein the 1st and 2nd rats could be the same and communications on the 1st and 2nd RAT could occur simultaneously or not.

A UE knows that a message received over side link is for a certain ProSe application based on the destination Layer-2 ID used for the message. This is provided for, for example in 3GPP TS 23.285, *"Architecture enhancements for V2X services"*, as for example provided in v. 14.3.0, June 2017. The Layer-2 ID code point values are not defined in the 3GPP specification and are left to be chosen by the operator community. However, the Layer-2 ID may be configured within the UE.

Registration and SIP Signaling

Utilizing the infrastructure described above, in the embodiments of the present disclosure a relay UE acts as an IMS/SIP proxy for each remote UE that is connected locally by some means to the relay UE. Such means are referred to herein as a local connection. Using this local connection, the relay UE may then provide for SIP sessions to the remote UE.

As used herein, a "relay UE" is a device that has its own data connectivity and can share this data connectivity to other devices. In some cases such relay UE may be associated with a vehicle, but in other cases the relay UE may be provided in a non-vehicular application. In some cases, the relay UE may also be referred to as a Vehicle-to-Recipient (V2X) module.

Further, a SIP proxy is a functional or logical entity that may act as one or both of a server and a client for the purpose of receiving and making SIP requests on behalf of other clients. The SIP proxy receives SIP requests and may modify the contents of the SIP requests before proxying the SIP request on. However, the identifiers used to uniquely identify a SIP session typically are not modified. In the context of this disclosure, a SIP proxy may be replaced by a Back-to-Back User Agent (B2BUA). A B2BUA terminates a first incoming session/dialogue and originates a second session/dialogue, typically using one or more items of data obtained from the first incoming session/dialogue in the originated second session/dialogue. Definitions from IETF RFC 3261, "SIP: Session Initiation Protocol", June 2002, are also applicable. Such definitions include:

Proxy, Proxy Server: An intermediary entity that acts as both a server and a client for the purpose of making requests on behalf of other clients. A proxy server primarily plays the role of routing, which means its job is to ensure that a request is sent to another entity "closer" to the targeted user. Proxies are also useful for enforcing policy (for example, making sure a user is allowed to make a call). A proxy interprets, and, if necessary, rewrites specific parts of a request message before forwarding it.

Back-to-Back User Agent: A back-to-back user agent (B2BUA) is a logical entity that receives a request and processes it as an user agent server (UAS). In order to determine how the request should be answered, it acts as a user agent client (UAC) and generates requests. Unlike a proxy server, it maintains dialog state and must participate in all requests sent on the dialogs it has established. Since it is a concatenation of a UAC and UAS, no explicit definitions are needed for its behavior.

Figure 5:
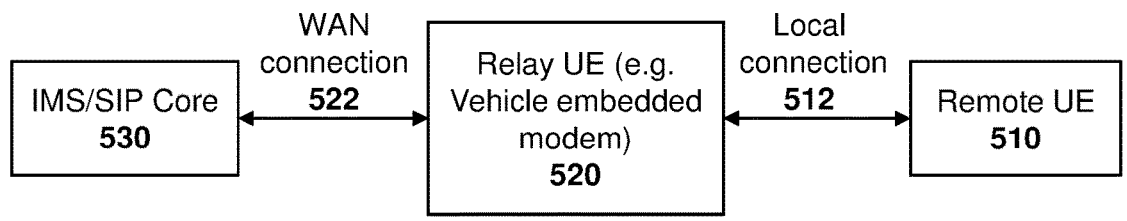
FIG. 5 is a block diagram showing a basic architecture for a remote user equipment to use a relay user equipment for IMS.

Referring to FIG. 5, a remote UE 510 communicates through a local connection 512 with a relay UE 520. Relay UE, for example, may be a vehicle embedded modem in one embodiment.

Relay UE 520 then may use a wide area network (WAN) connection 522 to communicate with an IMS/SIP Core 530. As used herein, a WAN connection can be any wired or wireless connection to a wide area network, and can include $2^{nd}$ Generation, $3^{rd}$ Generation, 4th Generation, 5th Generation or future cellular technologies, connections to access points, wired connections such as fiber or Ethernet connections, among other options. The Relay UE may, but need not, use the same radio access technology for the WAN connection and the LAN connection.

A WAN connection 522 could utilize one or more different wireless technologies or a wired connection could be used in limited circumstances. For example, when a vehicle associated with the vehicle embedded modem is stationary, such as when it is parked or being recharged and therefore may have a wired connection.

In one embodiment, a WAN connection could utilize a PDN connection, for example over a LTE radio access technology, or a PDU session, for example over a 5G radio access technology, to a PDN residing in either the remote UE's HPLMN, the relay UE's HPLMN or the relay UE's VPLMN. In all cases, there is no impact on network access stratum (NAS) signaling and procedures.

The remote UE 510 may provide some information or data to the relay UE 520 before any IMS registrations. Further, the remote UE 510 could optionally provide the information before PDN connections are established. Such information could be provided in order to configure the relay UE 520 for the intended IMS applications to be used. For example, applications may include VoLTE, RCS, mission-critical applications such as Mission Critical Push To Talk (MC PTT), Mission-Critical Video (MC video), or Mission-Critical Data (MC data), Future Railway Mobile Communication System (FRMCS), among other options.

Once the remote UE 510 has IMS registered using the relay UE 520, then incoming and outgoing calls or sessions to or from the remote UE are proxied by the relay UE 520. For incoming calls or sessions to a remote UE 510 that has registered via the relay UE, the relay UE can negotiate or police what media is allowed for the call. For example, if the associated vehicle is currently being driven, then an incoming video call to a remote UE owned by the driver could be renegotiated or downgraded to a voice call. Similarly, outgoing calls or sessions from a remote UE that had registered via the relay UE 520 can be initiated by the remote UE 510 itself, or the relay UE 520 on behalf of a remote UE 510 could initiate the outgoing session. Such initiation may be triggered by another connected device. For example, an infotainment system may be associated with the relay UE 520. An infotainment system may comprise hardware and software associated with a vehicle that can present media to users in close proximity of a vehicle and which may consist of one or more of a head-unit, one or more speakers, one or more displays, one or more microphones, among other options.

Figure 6:
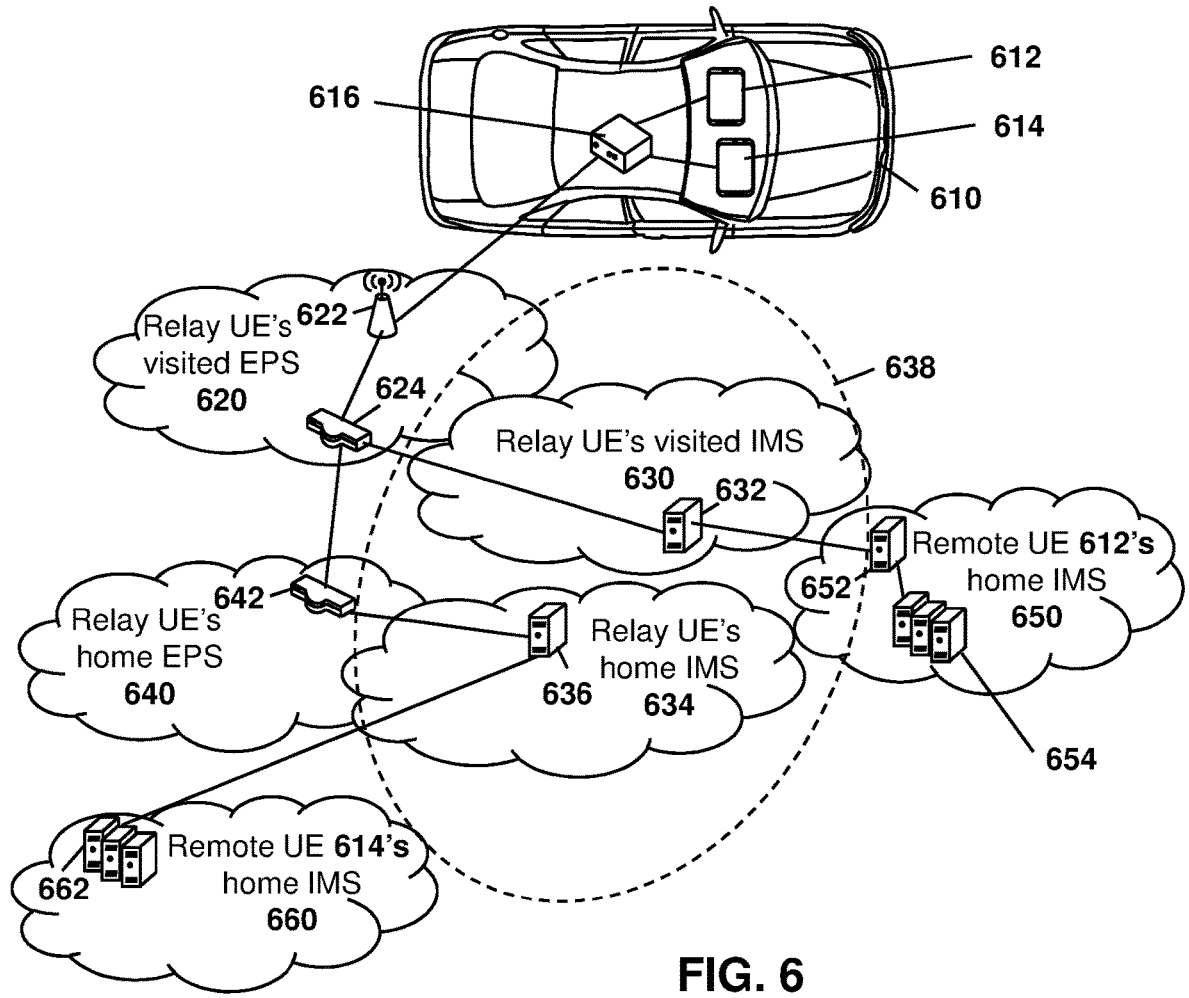
FIG. 6 is a block diagram showing an example architecture for the embodiments of the present disclosure.

Reference is now made to FIG. 6, which shows an example architecture that could be used with regard to the embodiments of the present disclosure. However, the architecture of FIG. 6 is merely provided as an example, and other architectures are possible.

In the example of FIG. 6, a vehicle 610 includes a first UE 612 and a second UE 614. Such UEs may, for example, be associated with passengers within vehicle 610.

Further, a relay UE 616 may be a vehicle mounted modem and may therefore have a better antenna and better reception to remote networks. In accordance with the embodiments of the present disclosure, UEs 612 and 614 connect through relay UE 616 to access IMS services.

Relay UE 616 may connect through an access point 622 to the relay UE's visited EPS 620. Traffic may then be routed to the S-GW 624 for the relay UE's visited EPS 620. As will be appreciated by those in the art, S-GW 624 will be used if the relay is roaming and an S8HR is used. Conversely, the node may be a P-GW (not shown) when the relay UE is not roaming or if the relay UE is roaming and a local breakout (LBO) is used.

P-GW 624 connects with a P-CSCF 632 within relay UE's visited IMS 630.

In the embodiment of FIG. 6, traffic that is being routed for remote UE 612 may then be routed to the P-CSCF 652 in remote UE 612's IMS 650.

Such traffic may then be routed to the core network nodes 654 which may, for example, include the I-CSCF, the S-CSCF, the HSS, one or more ASs, among other options.

Traffic from S-GW 624 may also be sent to the relay UEs home EPS 640 utilizing a P-GW 642. The traffic may then be sent to the relay UE's home IMS 634 and specifically to a P-CSCF 636.

The traffic may then be routed to remote UE 614's home IMS 660 and in particular to the core network nodes 662.

In accordance with the embodiments described below, one of two following modes of operation may be used. In the first mode of operation, the relay UE may be acting as a Layer-2 relay. This means that the remote UE has a first IP address and the relay UE has a second IP address. For SIP requests that contain an SDP offer and/or SDP answer, the connection data line can have the IP address of the UE that the media is being targeted to. Thus, the IP address can be the first IP address or the second IP address.

In a second mode of operation, the relay UE may act like a NAT. The relay UE thus keeps the state of where incoming media and SIP requests are to be routed. In order to do this when a SIP request is received at the relay UE, the relay UE needs to remember if such message should be routed on to the remote UE or not. If the remote UE receives a SIP control message and the sequence of messages to the remote UE resulted in a session being established, then the media is routed to the remote UE. Otherwise, the media is terminated at the relay UE.

In effect, the relay UE hosts a STUN and/or TURN server while the remote UE hosts STUN and/or TURN clients. This functionality is provided below.

In the embodiments described below, both the registration as well as the SIP messaging are described.

First Mechanism for IMS Registration

In accordance with a first embodiment of the present disclosure, a remote UE utilizes a relay UE to perform IMS registration with the remote UE's home IMS via the relay UE's home IMS. Specifically, the home IMS is the IMS of the HPLMN of the UE. Further, in one embodiment, the registration may optionally be via the relay UEs visited IMS. In other words, the visited IMS is the IMS of the VPLMN to which the remote UE is currently attached. The registration is for IMS related signaling and media.

The relay UE acts as a SIP Back To Back User Agent (B2BUA) and as a media gateway with certain enhancements. In particular, the SIP B2BUA functionality terminates and resends all SIP messaging between the remote UE and the relay UE's P-CSCF. Further, when the remote or relay UE acts as a media gateway, the remote or relay UE terminates media received from the network and the UE then relays it on to the other side. As used herein, a media gateway may be any functional or logical entity that can convert media streams.

The enhancements include, but are not limited to, inclusion of an indication that the SIP/IMS registration is for a remote UE in order to prevent the relay UE being deregistered by the relay UE's IMS. To the remote UE, the relay UE may appear to be a P-CSCF, however, when messaging arrives at the Relay UE, the Relay UE may perform the function of a B2BUA or a SIP Proxy. Further, to the P-CSCF of the remote UE's IMS, the relay UE may appear to be a remote UE.

The relay UE may use either the visited IMS or home IMS. The use of each may depend on whether the relay UE is utilizing a PDN in the relay UE's home network, which may be referred to as an S8HR, or a PDN in the relay UEs visited network, which may be referred to as an LBO.

By utilizing the relay UE's IMS connection to its visited or home IMS, and by including an indication that the registration is for the remote UE, the remote UE can use the relay UE's IMS PDN connection and provides full visibility to the relay UE's access network of IMS signaling and subsequently of IMS data used. This in turn allows the quality of service or quality of experience to be applied to IMS calls or sessions. Further, it allows the relay UE to service or terminate incoming or outgoing sessions, which is useful if the relay UE is, for example, an infotainment system in the vehicle.

Figure 7:
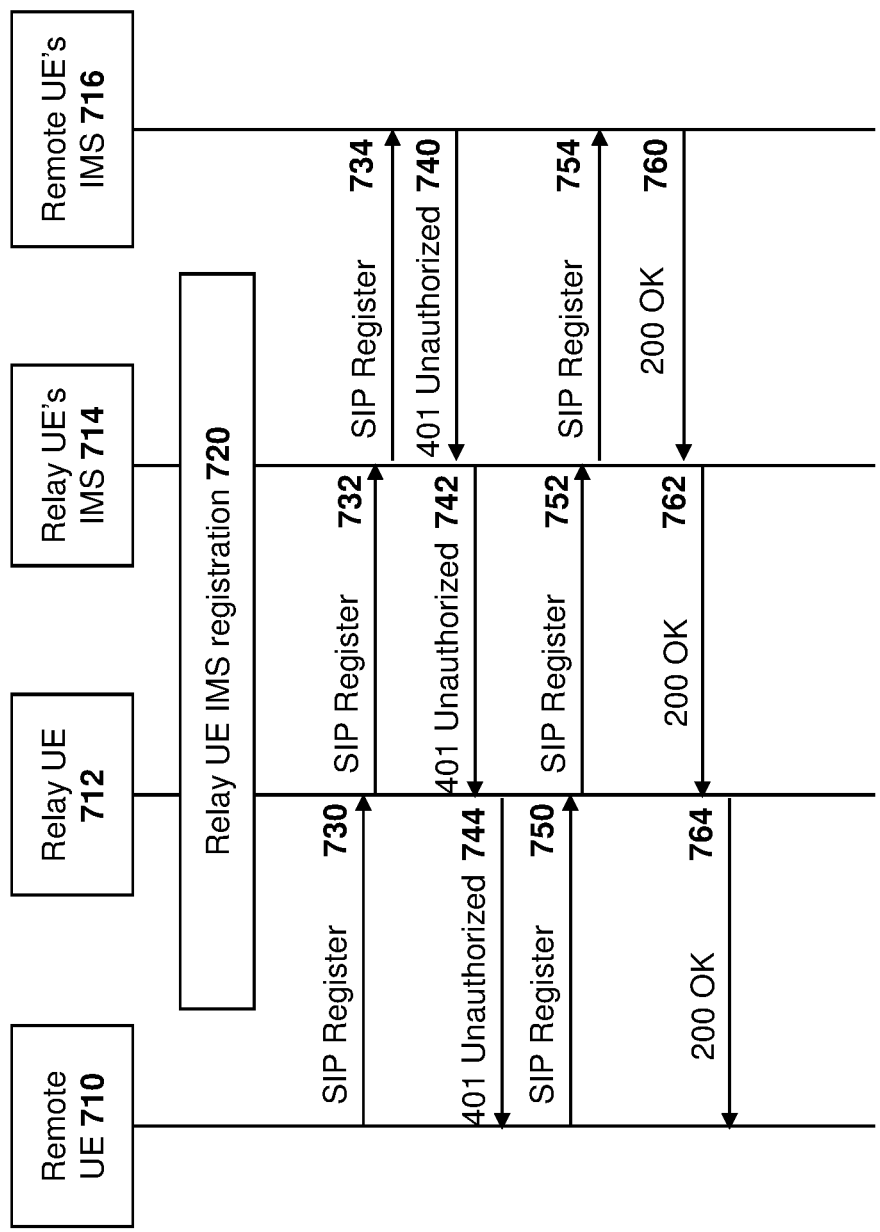
FIG. 7 is a dataflow diagram showing a first embodiment for registration of a remote user equipment through a relay user equipment.

Reference is now made to FIG. 7. The embodiment of FIG. 7 shows a remote UE 710 communicating with a relay UE 712. Further, the relay UE's IMS is shown with block 714 and the remote UE's IMS is shown with block 716. In some embodiments, the relay UE's IMS and the remote UE's IMS may be the same IMS.

In accordance with the embodiment of FIG. 7, the relay UE 712 registers with the relay UE's IMS 714, as shown with block 720. The registration at block 720 uses standard IMS registration procedures, over the relay UE's IP connection to the relay UE's IMS. The relay UE's IP connection to the relay UE's IMS can be over a PDN connection and the PDN connection could be a PDN connection to the IMS APN using LBO or S8HR.

As part of the registration at block 720, the relay UE 712 may include an indication to the relay UE's IMS 714 that the relay UE wishes to take on the role or function of a relay UE, as for example described herein in various embodiments in the present disclosure. The remote UE may further receive an indication from the relay UE's IMS 714 that the relay UE is permitted to take on the role or function of a relay UE. The message indicating that the relay UE is permitted to take on the role may be as a result of the request to become a relay, or may be sent unilaterally by the relay UE's IMS 714.

Subsequently, the remote UE 710 wishes to register for SIP services utilizing relay UE 712. In this case, remote UE 710 sends a SIP register message 730 to relay UE 712 via a local connection.

In response to receiving the SIP register message 730, relay UE 712 creates or constructs a new SIP register using information from the message 730. Relay UE 712 may then perform one or more of the following.

In a first embodiment, the relay UE may exchange, replace or swap some or all instances of the remote UE's IP address with its own IP address or addresses. In other words, the IP addresses from the interface that the remote UE used for the local connection to the relay UE may be swapped with the IP addresses of the relay UE's interface that the relay UE 712 used to perform the registration at block 720.

In a second embodiment, the relay UE 712 may add or include a relay UE indication into the SIP register. Such indication may be a SIP header, a SIP header option, a SIP request XML body, among other options. The relay UE indication may be used to inform the remote UE's IMS 716 that this SIP register is a SIP register that is being relayed. In other words, the SIP register has not originated from the relay UE 712.

In a third embodiment, the relay UE may exchange, replace, or swap out some or all instances of the remote UE's International Mobile Equipment Identifier (IMEI) with its own IMEI. The relay UE 712 may also include an indication of the remote UE's IMEI. This may be done for example in the SIP header, in the XML body of the SIP register, among other options.

In some embodiments, the three actions provided above for the relay UE 712 may be used independently, or may be combined in various combinations.

The relay UE 712 then forwards, proxies or sends the new SIP register to an entity on the relay UE's IMS 714. Such entity may be any node, host, SIP server, or SIP proxy in the relay UE's IMS and can include, for example, the P-CSCF, the I-CSCF, the S-CSCF among other options. The message may be forwarded as shown by message 732 in the embodiment of FIG. 7 and may result in the third-party registration being sent to the application server.

The relay UE 712 also creates a binding between the remote UE and the SIP register that was sent to the relay UE's IMS 714 in order to ensure the responses received to the SIP register can be relayed or proxied to the correct remote UE 710. The binding could include, but is not limited to the following:

If the same Call-ID is included in the SIP REGISTER sent to the Relay UE's IMS 714 then the Relay UE 712 binds the Call-ID included in the received SIP REGISTER from the Remote UE 710 to one or more identities of the Remote UE used on the local connection e.g. an IP address of the Remote UE used on the local connection, a MAC address belonging to the Remote UE used for the local connection, a MAC address belonging to the Relay UE used on the local connection, etc.

If a different Call-ID is included in the SIP REGISTER sent to the Relay UE's IMS 714 then the Relay UE 712 binds the Call-ID included in the received SIP REGISTER from the Remote UE to the Call-ID included in the SIP REGISTER sent to the Relay UE's IMS and optionally also one or more identities of the Remote UE used on the local connection e.g. an IP address of the Remote UE used on the local connection, a MAC address belonging to the Remote UE used for the local connection, a MAC address belonging to the Relay UE used on the local connection, among other options.

In response to receiving the SIP register from the relay UE 712, a node on the relay UE's IMS 714 may perform a verification that the relay UE 712 is allowed to perform the function or role of a relay UE. Such check may be done based on the received relay UE indication in the SIP registration message. If the check is performed and the relay UE cannot or is prohibited from performing the role of a relay UE, then an error response may be sent back to the relay UE 712.

However, if the check is performed and the relay UE 712 is allowed to perform the role of a relay UE, or if the check is not performed in some embodiments, the same node or a different node of the relay UE's IMS 714 may perform both of the following. The relay UE's IMS 714 may add a relayed indication to the SIP register message. Such relayed indication may be made by modifying the same field or information element as the relay UE indication in message 732. For example, the SIP header, SIP header option, SIP request body XML, among other options, may be varied at relay UE's IMS 714. Alternatively, the information may be added as a new field or information element in the SIP register message and may be added as a SIP header, SIP header option, SIP request body XML, among other options.

In addition to adding the indication, the relay UE's IMS 714 may forward the received SIP register message 732, including the modifications, to a node in the remote UE's IMS 716. Such node may include, but is not limited to, the P-CSCF, the I-CSCF, the S-CSCF, the AS, among other options, of the remote UE 710. The SIP register message sent from the relay UE's IMS 714 to the remote UE's IMS 716 as shown by message 734. This message may be sent using standard procedures, for example as defined in 3GPP TS 24.229, *"IP multimedia call control protocol based on Session Initiation Protocol (SIP) and Session Description Protocol (SDP); Stage 3"*, as for example provided in v. 14.3.1, March 2017.

In response to receiving the SIP register from the relay UE's IMS 714, the node in the remote UE's IMS 716 may perform a verification or check that the remote UE is allowed to use a relay UE 712, which may be performed due to receiving the relayed indication in the SIP register message. If the check is performed and the use of the relay UE is prohibited, then an error response such as but not limited to "403 forbidden" response, may be sent to the relay UE's IMS 714.

Conversely, if the check is performed and the remote UE 710 is allowed to use a relay UE 712, or if the check is not performed, then the same node or another node in the remote UE's IMS 716 may process the SIP register utilizing standard procedures. For example, authentication may be performed in a security challenge and a SIP 401 unauthorized response may be sent back to the remote UE's IMS 716. This is for example defined in 3GPP TS 24.229. Such 401 unauthorized message is shown with regard to message 740 in the embodiment of FIG. 7 and is sent to Relay UE's IMS 714.

In response to receiving the SIP response from the remote UE's IMS, the relay UE's IMS 714 then forwards the received SIP response to the relay UE 712 using standard procedures such as those defined in the 3GPP TS 24.229. Such forwarding is shown with message 742 in the embodiment of FIG. 7.

In response to receiving the SIP response from the relay UE's IMS 714, the relay UE 712 may perform a look up on the Call-ID of the received SIP response from the relay UE's IMS 714 in the binding store, as for example created prior to sending message 732 above.

If the lookup is successful and thus the remote UE is found to be bound to the Call-ID of the received SIP response, the relay UE 712 creates a new SIP response using information from the response, and may perform one or more of the following. In a first embodiment, the relay UE 712 may exchange or swap out some or all instances of its own IP address with the remote UE's IP address. Thus, the relay UE 712 may swap in the IP addresses of the remote UE's interface that the remote UE used to perform the SIP register. In addition, or instead, the relay UE 712 may add a relay UE indication, for example, as a SIP header, SIP header option, a SIP request XML body, among other options, into the SIP register to inform the remote UE 710 that this SIP response is being relayed, and therefore has not originated from the relay UE 712.

The relay UE 712 then forwards the new SIP response to the remote UE 710 in message 744.

Remote UE 710 may then perform standard security procedures, for example as defined in the 3GPP TS 33.203, "3G security; Access security for IP-based services", as for example provided in v.14.0.0, March 2017 specification, and creates a new SIP register message 750. Message 750 may contain a security challenge response generated by the remote UE 710 based on the 401 unauthorized message 744. Message 750 is then sent to relay UE 712.

Relay UE 712 may then perform similar functionality as with SIP register message 730. Specifically, relay UE 712 sends a SIP register message 752 to relay UE's IMS 714.

The relay UE's IMS 714 may then perform similar functionality as when it received message 732 when it receives message 752. The relay UE's IMS 714 may forward the SIP register message to the remote UE's IMS 716 in SIP register message 754.

In response to receiving message 754, remote UE's IMS 716 may perform a verification that the remote UE is permitted to use a relay UE, which may be performed due to receiving the relayed indication in the SIP register. If the check is performed and the use of the relay UE is prohibited, then an error response may be sent to the relay UE's IMS 714. Such error response, for example, may be a "403 forbidden" response.

If the check is performed and the remote UE 710 is allowed to use the relay UE 712, or if the check is not performed, for example because the check was already performed in a previous step, then the same node or another node of the remote UE's IMS 716 may process the SIP register as per standard procedures. For example, the message may perform authentication using the received security challenge response and may then send a SIP 200 OK message 760 back to the relay UE's IMS 714.

On receiving message 760, the relay UE's IMS 714 may perform similar functionality to when it received message 740. The relay UE's IMS sends message 762 with a 200 OK indication back to relay UE 712.

The relay UE 712 may then perform similar functionality to when it received message 742. In addition, the relay UE may create a binding between remote UE's IMS/SIP public user identities, for example as included in the P-associated-URI SIP header of a received 200 OK SIP response, and one or more identities of the UE on the interface between the remote UE 710 and the relay UE 712. For example, such binding may use an IP address the remote UE used on the interface between the remote UE and the relay UE, a MAC address of the remote UE, a MAC address of the relay UE that is used by the interface to the remote UE, among other options. This binding can then be used later for relaying any SIP related messaging from the remote UE's IMS 716 to the remote UE 710 for the duration of the remote UE's registration with the remote UE's IMS 716.

The relay UE 712 may then send the 200 OK message 764 to remote UE 710.

Based on FIG. 7, the remote UE 710 is now registered with its IMS 716 via the relay UE 712 and the relay UE's IMS 714, and the remote UE 710 can send outgoing and receive incoming calls or sessions.

When the remote UE performs a deregistration with the remote UE's IMS 716, the relay UE 712 may then remove the bindings created above upon receiving message 762.

The embodiment of FIG. 7 may be performed for additional remote UEs connected via the same or different relay UE over a local connection.

The binding performed at the relay UE 712 on receiving the SIP register message may also, or alternatively, use one or more pieces of information associated with the local connection, for example the interface ID, MAC address, IP address, port number, among other options.

The binding may further include information about the remote UE, including the IMS Private User Identity (IMPI), one or more IMS Public User Identities (IMPU), SIP Uniform Resource Identifier (URI), Tel URI, serial numbers, IMEI, among other options.

Encapsulation

In various registration and media transfer embodiments described below, encapsulation of the SIP messaging is provided. Therefore, in accordance with one embodiment, general tunneling or encapsulation procedures are provided.

In particular, the present disclosure provides for embodiments in which a generic tunneling procedure is described showing how a remote UE can send and receive SIP requests and their responses utilizing a relay UE, where the relay UE sends the SIP requests and responses in a second SIP request. An application server receives the tunneled or encapsulated messages and performs similar functionality to the relay UE.

Figure 8:
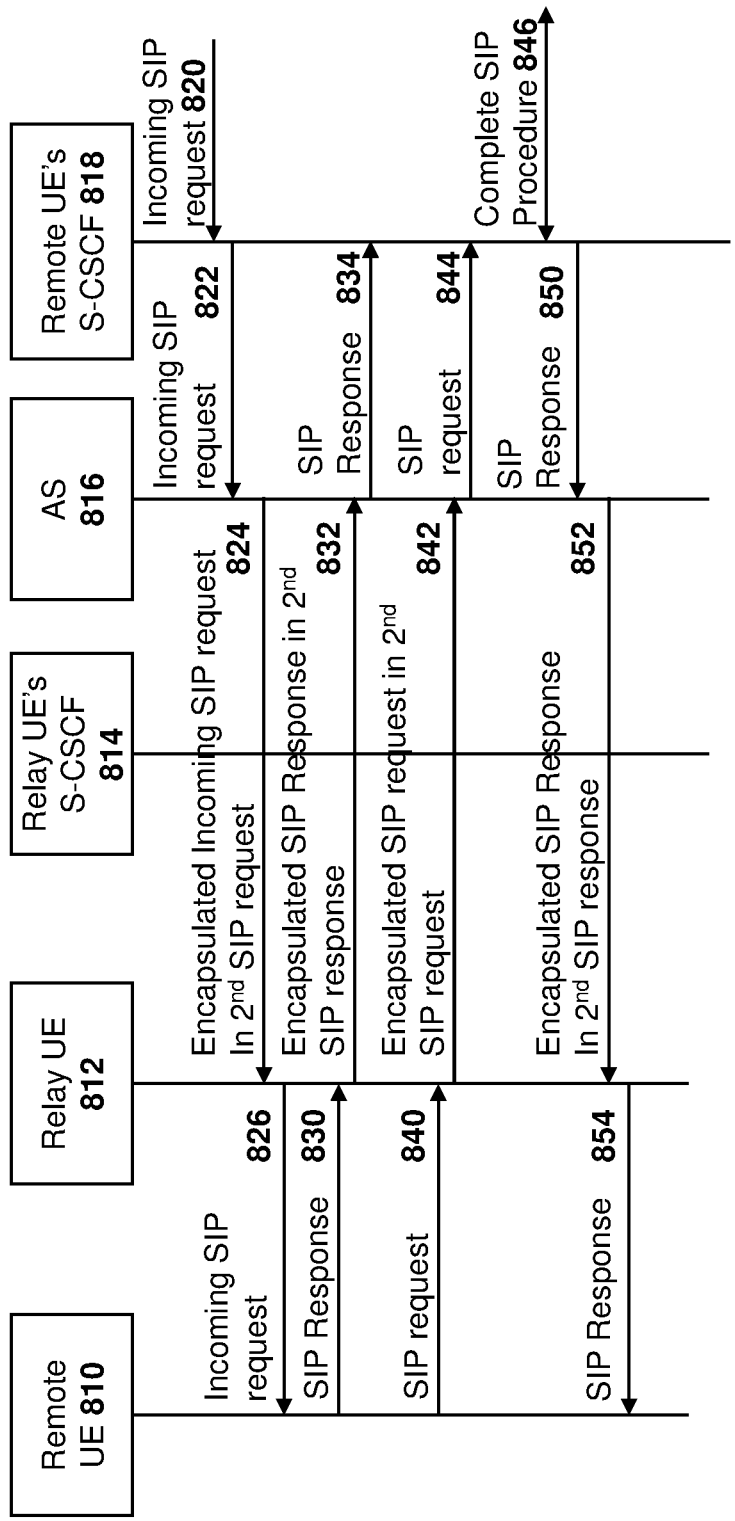
FIG. 8 is a dataflow diagram showing encapsulation of a SIP request/response within another SIP request/response for IMS messaging utilizing a relay user equipment.

Reference is now made to FIG. 8. In FIG. 8 a remote UE 810 utilizes a relay UE 812 for relaying SIP communications. The relay UE 812 has an associated S-CSCF 814. Further, an application server (AS) 816 services SIP requests and the remote UE's S-CSCF 818 receives SIP communications. In some embodiments, the Relay UE's S-CSCF 814 and Remote UE's S-CSCF 818 may be the same entity.

In the example of FIG. 8, S-CSCF 818 receives an incoming SIP request in message 820 and forwards the incoming SIP request to the AS 816 in message 822.

The application server 816 receives the first SIP request from the S-CSCF 818. It may then encapsulate the first SIP request into a second SIP request. As used herein, encapsulation means that the first SIP request is placed within a second SIP request either in its entirety or partially.

The second SIP request may further contain various indications for a receiving party of the encapsulated SIP request. In particular, indications may provide that the second SIP request contains an encapsulated first SIP request. The indications may further provide the address of the party that should receive the first SIP request. Further, the encapsulated second SIP method may include a Transaction Identifier, wherein the transaction identifier is used to identify the sending party for the first SIP request, the receiving party for the SIP request and/or the first SIP method dialogue.

For example, Table 3 below shows an example of the feature tags for a Transaction Identifier.

TABLE 3

Example feature tags for Transaction ID g.3gpp.ims.transactionID feature tag set to Remote UE User ID and or number
(e.g. +g.3gpp.ims.transactionID = user@domain.com, number)
Where user@domain.com is optional, and user@domain.com is an ID of the REMOTE UE The encapsulated incoming SIP request in the second SIP request may then be sent from AS 816 to the relay UE 812 in message 824, which may optionally traverse/be proxied by Relay UE's S-CSCF 814.

Relay UE 812 receives the second SIP request encapsulating the first SIP request from AS 816 or Relay UE's S-CSCF 814. It may further receive the indication providing that the second SIP request contains the encapsulated first SIP request. It may further include the address of the remote UE 810 that the first SIP request is to be forwarded to. Further, a transaction identifier may be received and used to identify the various SIP user agents. As used herein, a SIP User agent is the functionality in a UE/ME/server/application server. The UE/ME/Server/application server may implement at least one of: User Agent Client (UAC); User Agent Server (UAS).

A user agent client is a logical entity that creates a new request, and then uses the client transaction state machinery to send it. The role of UAC lasts only for the duration of that transaction. In other words, if a piece of software initiates a request, it acts as a UAC for the duration of that transaction. If it receives a request later, it assumes the role of a user agent server for the processing of that transaction.

A user agent server is a logical entity that generates a response to a SIP request. The response accepts, rejects, or redirects the request. This role lasts only for the duration of that transaction. In other words, if a piece of software responds to a request, it acts as a UAS for the duration of that transaction. If it generates a request later, it assumes the role of a user agent client for the processing of that transaction.

A User Agent (UA) is a logical entity that can act as either a user agent client and user agent server.

Relay UE 812 may then extract the first SIP request from the second SIP request and send the first SIP request to the remote UE 810 in message 826. The first SIP request may be amended to include an indication that the first SIP request has been sent from a first UE or SIP user agent. Such SIP user agent may be any functional or logical entity that can act as both a user agent client (UAC) and a user agent server (UAS).

Based on the receipt of message 826, remote UE 810 may then send a SIP response in message 830 back to relay UE 812.

Relay UE 812 receives the SIP response message 830 and may encapsulate the SIP response in a second SIP response, where the encapsulation may be similar to that described above with regards to encapsulation performed by AS 816. In particular, the second SIP response may contain the encapsulated SIP response, and address of a UE or user agent that the SIP response should be sent to, the address of a UE or user agent that originated the SIP response and/or a transaction identifier received in the second SIP response at message 824. The second SIP response could also be a response message to the second SIP request at message 824.

The application server receives the encapsulated SIP response in message 832. Such encapsulated response in message 832 may, as indicated above, traverse/be proxied by the Relay UE's S-CSCF, contain the address of the user agent that the response should be sent to, contain the address of the user agent that originated the SIP response, and contain the transaction identifier, wherein the transaction identifier is used to associate the first SIP response with the SIP response. The application server 816 may extract the SIP response from the encapsulated SIP response and then forward the SIP response in message 834 to the remote UE's S-CSCF 818. The destination for message 834 may be determined from at least one of a transaction identifier, the address of the destination user agent, among other options.

In another embodiment, the encapsulation may be performed on SIP requests that originate at remote UE 810. In FIG. 8, this is shown with message 840, which is a SIP method sent from remote UE 810 to the relay UE 812. The relay UE 812 receives message 840, which may contain an indication that the SIP request should be encapsulated in some embodiments.

The relay UE 812 then encapsulates the first SIP request into a second SIP request. The second SIP request may contain indications to indicate that the second SIP request contains an encapsulated first SIP request. Further the encapsulated message may contain an address of the UE or user agent that sent the first SIP request. Further, in some embodiments the encapsulated message may include a transaction identifier, where the transaction identifier is used to identify the destination user agent, the user agent that originated the SIP request, and dialogue from the first SIP request.

The encapsulated SIP request is sent from relay UE 812 to AS 816 in message 842 in the embodiment of FIG. 8, which may traverse and/or be proxied by Relay UE's S-CSCF 814.

At application server 816, the encapsulated message 842 is received, where the message 842 may contain indications providing that the second SIP request encapsulates a first SIP request. Further, message 842 may indicate an address of the UE or SIP user agent that sent the first SIP request along with a transaction identifier as described above.

Application server 816 may then extract the first SIP request from the second SIP request and send the first SIP request to the destination address. In the example of FIG. 8, the SIP request is forwarded in message 844 to the remote UE's S-CSCF 818.

The SIP procedure may then be completed as shown by arrow 846 and a SIP response message 850 is generated as a result. SIP response message 850 is sent to AS 816.

At AS 816, the SIP response is received and encapsulated in a new SIP response to message 842 (e.g. 18x, 2xx etc). The encapsulated SIP request is then sent to the relay UE 812 in message 852, which may traverse/be proxied by Relay UE's S-CSCF 814. Message 852 may contain indications providing that the SIP response contains an encapsulated SIP response. The indications may further provide the address of the UE or user agent that the SIP response was received from and the address of the user agent that the SIP response is destined for. Further, a transaction identifier may be provided with the encapsulated SIP response in message 852.

Relay UE 812 receives the encapsulated SIP response and may use indications such as the fact that the response contains an encapsulated SIP response, the address of the originating party and the destination party, and a transaction identifier, to extract the SIP response from the encapsulated response and forward the SIP response in message 854 to the remote UE 810.

The remote UE 810 may also behave differently depending on the contents of the incoming SIP requests, for outgoing SIP request or for incoming or outgoing SIP responses. Specifically, the incoming SIP request or response may include indications that the SIP request or response was sent from a first SIP user agent. Further indications may be provided that the SIP request or response was sent via a second SIP user agent, where the second SIP user agent is the relay UE 812. In this case, the remote UE 810 may provide a SIP response such as that provided in message 830 with indications that the first SIP response is to be encapsulated.

Further, a SIP request such as message 840 may also include indications that the request should be encapsulated.

In further embodiments, the first SIP request or response may be encapsulated in an encrypted format to protect the contents of the first SIP request or response. An indicator to relay UE 812 or AS 816 indicating encryption is needed may be provided.

Second Mechanism for IMS Registration

In accordance with a further embodiment of the present disclosure, a remote UE registers via relay UE using a tunneling or encapsulation mechanism to an application server that then acts on behalf of the remote UE. Utilizing this mechanism, the relay UE tunnels SIP messages between the remote UE and the application server.

In the discussion below, user identity is used. This may be a single user identity or may be a plurality of user identities. Further, user identities could be any one or a combination of public user identities, private user identities, device identities, among other options.

Figure 9:
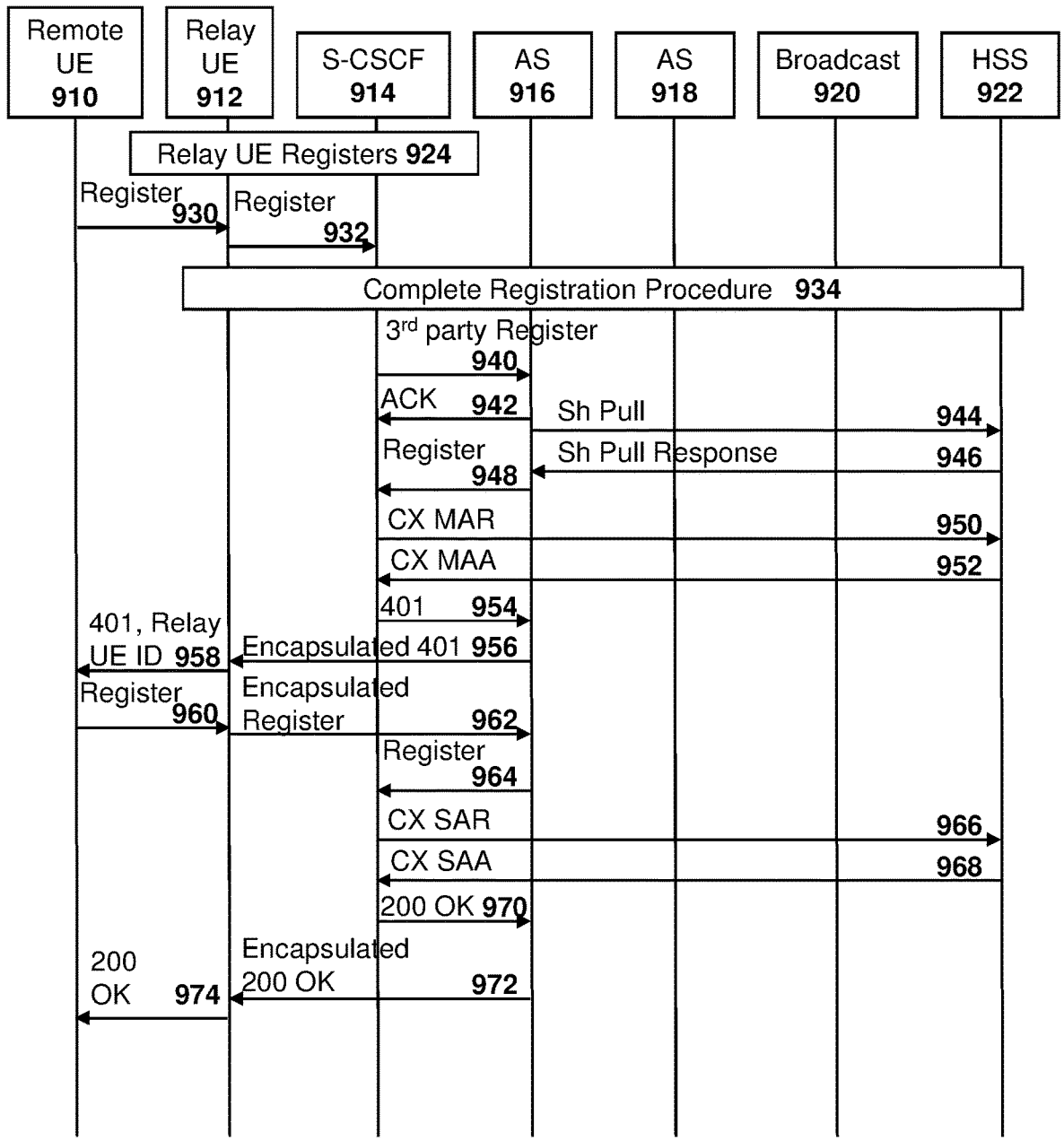
FIG. 9 is a dataflow diagram showing a second embodiment for IMS registration of a remote user equipment via a relay user equipment.

Reference is now made to FIG. 9, which shows an example registration procedure. In the example of FIG. 9, a remote UE 910 communicates with a relay UE 912. Further, an S-CSCF 914, a first application server 916, a second application server 918, a broadcast entity 920, and an HSS 922 are provided as part of the system. In some embodiments first application server 916 and second application server 918 may be the same entity.

In accordance with the embodiment of FIG. 9, the relay UE 912 performs a registration with the S-CSCF 914, shown by block 924. In particular, relay UE 912 may send a first registration type, including any of the (a) relay UE user identity; (b) indication that the UE may act as a relay UE or (c) other information relevant to the registration process. The S-CSCF 914 may receive the first registration type and complete the registration process of the relay UE.

Thereafter, relay UE 912 may act as a relay for remote UEs. A single UE is shown in the embodiment of FIG. 9. However multiple UEs may be connecting through a relay UE 912. Further, it is assumed that a trust relationship has been established between the remote UE and relay UE so that the registration processes can take place. A trust relationship may, for example, be established as described in 3GPP TS 33.303, subclause 6.7.3.

Remote UE 910 then may send a second registration type in message 930 to relay UE 912. The second registration type may include various information including, but not limited to, the remote UE user identity, an indication that the remote UE is acting as a remote UE, an indication of the services the remote UE supports or requests, and/or local connection ID addresses.

Relay UE 912 receives message 930. The relay UE 912 may store the received remote UE user identity against the remote UE local connection ID address.

The relay UE 912 may then send a message 932 comprising a third registration type. The message in 932 may include information including, but not limited to, the relay UE user identity, the remote UE user identity, an indication that the remote UE is acting as a remote UE, an indication that the third registration type is a remote UE registration or a relay registration, among other information. Message 932 for the new registration type may include some or all of the second registration type from message 930 and may be provided as either new headers, additions to existing headers, part of the XML body, among other options.

Further, in some embodiments relay UE 912 may receive a plurality of registration messages 930 from different remote UEs. These could then all be included in the message 932.

Once S-CSCF 914 receives registration message 932, the IMS registration procedure is completed for the relay UE, as shown by block 934.

Next, the S-CSCF 914 sends a third-party registration message 940 to the application server 916. Message 940 contains some or all of the data received in the registration message 932.

Application server 916 receives the third-party registration containing the data from message 932 and may determine that the third-party registration contains between zero to many registrations for remote UEs for a specific relay UE 912. The determination could be made based on indications contained in the second registration type that is within the third party registration message 940.

Specifically, the third party registration message contains a third registration type within it and this third registration type contains zero to many second registration types. The third registration types are the types received at message 932.

Application server 916, upon receiving message 940, may store the relay UE user identity, contact address and the associated remote UE user identities.

In one embodiment, registration message 932, the registration completion procedure 934 and the third party registration message 940 may be replaced utilizing the encapsulation messages of FIG. 8 above.

AS 916 may then send an acknowledgement in message 942 back to the S-CSCF 914 to indicate that the third party registration was successful.

Further, if the AS 916 did not receive a remote UE public user identity, the AS may send an Sh Pull message containing the private user identity of the remote UE to HSS 922, as shown by message 944.

The HSS 922 receives the Sh Pull message and, in response sends message 946 with a retrieved remote UE public user identifier associated with the private user identity of message 944.

AS 916 receives message 946 and stores the public user identifier associated with the private user identity.

AS 916 may then send a SIP registration request 948 containing the remote UE user identity received in message 946, feature tags and other SIP registration parameters, and the address of AS 916.

The S-CSCF 914 receives message 948 and may then perform a standard challenge, shown by CX MAR procedures per 3GPP TS 29.229 in message 950 and CX MAA procedures per 3GPP TS 29.229, *"Cx and Dx interfaces based on the Diameter protocol; Protocol details"*, as for example provided in v.14.1.0, March 2017, in message 952. The S-CSCF sends a 401 response to AS 916 in message 954, indicating that a challenge is being provided.

On receipt of the 401 response 954, AS 916 then encapsulates the 401 response in a SIP response (e.g SIP MESSAGE) 956 as described with regard to FIG. 8. In one embodiment, the SIP message Request-URI (R-URI) is equal to the relay UE SIP URI, and the reply to header is the contact address of AS 916.

Within the message 956 various information may be included, including the 401 response containing the authentication challenge vectors. Further, the message may contain an indication that the message contains a SIP method for remote UE 910. Further, the user identity of the remote UE 910 could be contained in the 401 response or as a separate parameter. For example a separate parameter may indicate that the target URI parameter is for the remote UE user identity.

The information may further contain the SIP message R-URI and reply to header, which were obtained from the HSS.

The relay UE 912 receives message 956 and stores the AS 916 address. Further, based either on an indication that message 956 contains a SIP method for the remote UE 910 or other separate parameter that contains the remote UE user identity, such as the target URI parameter and relay UE, the relay UE 912 uses the remote UE's user identity to determine the local connection ID address.

Based on the above, the relay UE 912 then sends the 401 response, along with the relay UE identifier, in message 958.

The remote UE 910 receives the 401 response and the challenge, and then performs procedures as described in 3GPP TS 33.203 to determine the response vectors. In addition, the remote UE then stores the user identities of the relay UE 912, if received.

The remote UE 910 then sends a second registration type message containing response vectors, an indication that the registration is of the second type and the remote UE user identity in message 960 to Relay UE 912.

Message 960 is received by relay UE 912, which encapsulates the registration message. The encapsulated registration message is sent as message 962 to AS 916. Message 962 may contain the R-URI, which equals the Public Service Identity (PSI) of the AS 916. Such PSI may be known from messages received from the AS 916.

Further, message 962 may contain an indication that the SIP message contains a message from remote UE 910.

AS 916 receives message 962, and unencapsulates or de-encapsulates or extracts the registration message. The registration message can then be sent to the S-CSCF 914 in message 964.

S-CSCF 914 may then perform CX SAR procedures in accordance with 3GPP TS 29.229, shown by message 966 and may further receive, from HSS 922, the CX SAA response in message 968.

Based on message 968, the S-CSCF 914 may send a 200 OK message 970 to the AS 916. The AS 916 may then encapsulate the 200 OK message to relay UE 912 within message 972. Message 972 may be a SIP message with R-URI equal to the relay UE SIP URI, and the reply-to header equal to the contact address of the remote UE.

Message 972 may further contain within it the 200 OK response, an indication that the message contains a SIP method for the remote UE 910, and the user identity of the remote UE, if not contained in the 200 OK response, among other options.

Relay UE 912 receives message 972, and based either on an indication that the message contains a SIP method for the remote UE and/or a separate parameter that contains the remote UE user identifier, may forward the 200 OK in message 974 to remote UE 910.

In the above, the local connection ID could be a Layer-2 ID. Specifically, a destination Layer-2 ID, as defined in 3GPP TS 36.321, "Evolved Universal Terrestrial Radio Access (E-UTRA); Medium Access Control (MAC) protocol specification", as for example provided in v. 14.2.1, April 2017, may be assigned to an IMS application over vehicle to destination (V2X) or PC5 sidelink interface. The IMS data part would be transmitted over the Physical Sidelink Shared Channel (PSSCH) as V2X information and contains the corresponding IMS messages. The Layer-2 ID can be configured in the internal memory of the mobile equipment, for example using the open mobile alliance (OMA) Device Management (DM), or stored on the USIM or ISIM.

Table 4 below shows an example where there is a Layer-2 ID for SIP control messages and another for the user plane. This information has been stored both in the UE to Network relay and in the remote UE. When the remote UE receives the PC5 message, inspecting the Layer-2 ID can be used to determine that it is an IMS message

TABLE 4

Example configuration information for defining Layer-2 ID 4.2.xx $EF_{IMSLayer2id}$ (IMS Layer 2 ID)
If service n°xx is "available", this file shall be present. This EF contains the configuration parameters for UE to Network Relay of IMS for Layer 2ID.

| Identifier: '6Fxx' | Structure: transparent | Optional |
| File size: n bytes | Update activity: low | |
| Access Conditions: | | |
| READ | ALW | |
| UPDATE | ADM | |
| ACTIVATE | ADM | |
| DEACTIVATE | ADM | |

| Bytes | Description | M/O | Length |
|---|---|---|---|
| 1 | Number of IMS Layer 2's | M | 1 |
| 2 | IMS Tag | M | 1 |
| 3-N | Layer-2 ID | M | N |

Contents:

Configuration for UE to Network Relay IMS Layer 2ID
Coding:

Coding IMS Tag

| Value | Meaning |
|---|---|
| "00000000" | SIP Method |
| "00000001" | SIP User plan |

TABLE 4-continued

Example configuration information for defining Layer-2 ID

| "00000010" | Encrypted SIP Method |
| "00000010" | Reserved |

Coding of the IMS tag byte
ALTERNATIVE
Only the Layer-2 ID is present in the file.

In Table 4 above, the example configuration information is provided for 3GPP TS 31.102, "Characteristics of the Universal Subscriber Identity Module (USIM) application", as for example provided in v.14.2.0, March 2017. The contents of Table 4 are an insertion into this specification. However, Table 4 provides only one example of a Layer-2 ID, and other options are possible.

Further, specific ITS application identifiers can be assigned to a SIP request, as for example defined in the European Telecommunications Standards Institute (ETSI) TS 102 965, "Intelligent Transport Systems (ITS); Application Object Identifier (ITS-AID); Registration list", as for example provided in v.1.3.1, November 2016. The identifiers may be assigned to derivative technologies for the SIP request. An example is provided in Table 5 below, which shows an additional line added to the International Standards Organization (ISO) TS 17419, "Intelligent transport systems—Cooperative systems—Classification and management of ITS applications in a global context", 2014. The change in Table 5 is added to the "Assigned Numbers" table of this specification.

TABLE 5

ITS Application Identifiers

| Field | Value |
|---|---|
| Date | 15.05.2011 |
| ITS-AID/PSID Numerical Value (decimal/hex) | 143 = 0x8f |
| ITS-AID/PSID unaligned PER of ASN 1 (hex) | 0p80.0f |
| ITS-AID/PSID unaligned PER of ASN 1 size | 1 |
| Assignment Status - status | assigned |
| Assignment Status - registrar | ISO |
| Owner | 3GPP SIP |
| ID | ITS application class |
| Specification | 3GPP TS.x.y.z |
| Owner | CEN/ISO |

Further, SIP method identifiers may be defined as specific message types that would be conveyed as part of the ITS Packet Data Unit (PDU) header. One possible implementation is shown with regard to Table 6 below.

TABLE 6

Extract ETSI TS 102 894-2
DF__ItsPduHeader

| Descriptive Name | ItsPduHeader |
|---|---|
| Identifier | DataType__ 1 |
| ASN.1 representation | ItsPduHeader ::= SEQUENCE { protocolVersion INTEGER (0..255), messageID INTEGER{ denm(1), cam(2), poi(3), spatem(4), mapem(5), ivim(6), ev-rsr(7), tistpgtransaction(8), srem(9), ssem(10), evcsn(11), SIP(12) , EncryptedSIP(13) } (0..255), stationID StationID } |
| Definition | Common message header for application and facilities layer messages. It is included at the beginning of an ITS message as the message header. The DF shall include the following information: • protocolVersion: version of the ITS message and/or |

TABLE 6-continued

Extract ETSI TS 102 894-2
DF_ItsPduHeader

|  |  |
| --- | --- |
| | communication protocol,<br>• messageID: Type of the ITS message. Following message type values are assigned in the present document:<br>- .....<br>- SIP(12): SIP METHODS<br>- SIP(13): Encrypted SIP METHODS<br>• stationID: the identifier of the ITS-S that generates the ITS message in question.. |
| Unit | N/A |
| Category | Communication information |

The example changes to the specification are shown in bold in the example of Table 6. In this way, the SIP requests/responses would coexist with different or other ITS/V2X messages on a given interface and may be used concurrently as part of different services.

Third Mechanism for IMS Registration

In a further embodiment, the remote UE performs a registration with the relay UE, causing the relay UE to perform an IMS registration or re-registration to the relay UE's visited IMS or the relay UE's home IMS. The registration or re-registration indicates an association with the remote UE, which in turn causes a third-party registration to a collision handling server. Such collision handling server may be used to manage access to the microphone or speaker resources in a vehicle, for example. Collision handling server may be implemented as an Application Server (AS).

Such registration has the purpose of binding the relay UE with the associated remote UE. The remote UE can then perform its own registration to the remote UE's home IMS, which in turn causes a third-party registration to the collision handling server.

As will be appreciated by those skilled in the art, whether the relay UE uses the visited IMS or home IMS may depend on whether the relay UE is utilizing a PDN in the relay UE's home network, sometimes referred to as S8HR, or a PDN in the relay UE's visited network, sometimes referred to as LBO.

Figure 10:
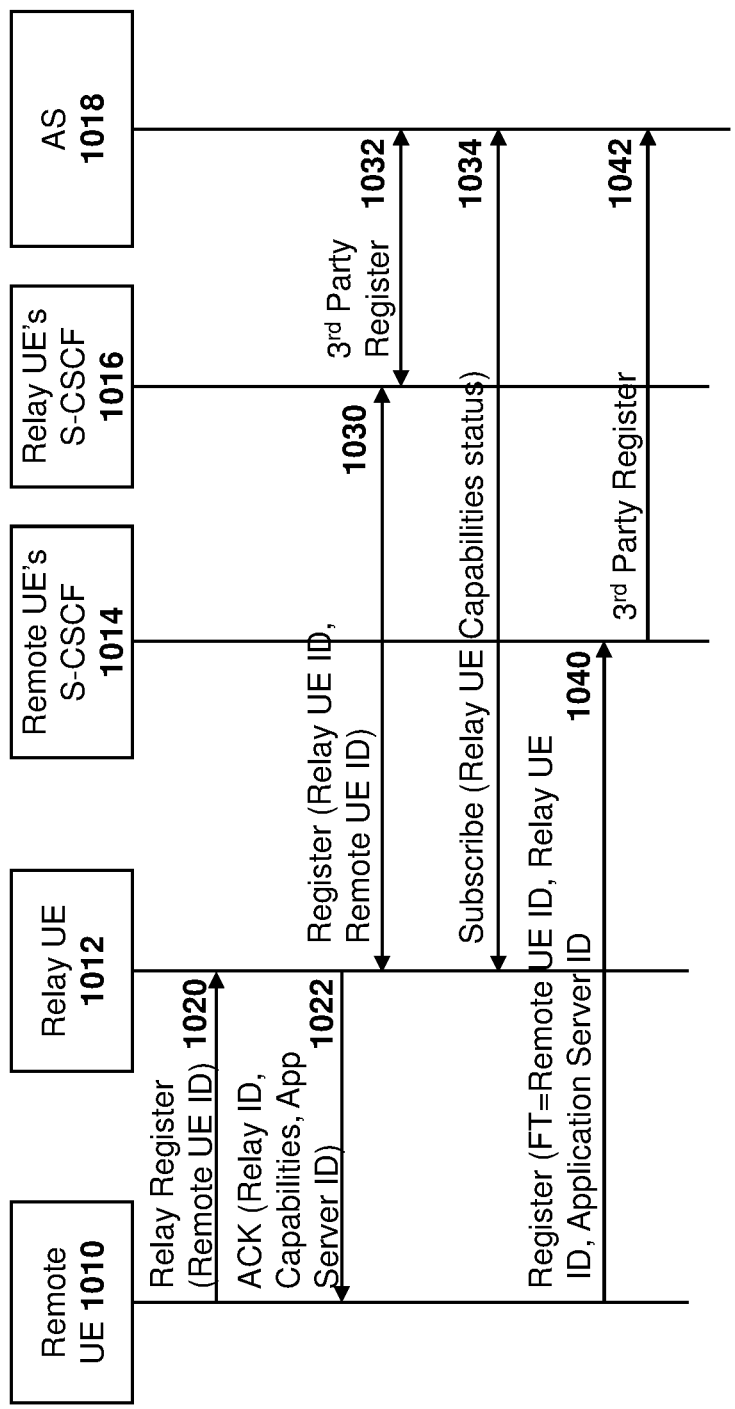
FIG. 10 is a dataflow diagram showing a third embodiment for IMS registration of a remote user equipment via a relay user equipment.

Reference is now made to FIG. 10. In the embodiment of FIG. 10, a remote UE 1010 communicates with a relay UE 1012. Further, the remote UE's S-CSCF 1014 and the relay UE's S-CSCF 1016 are on the network. In some embodiments, S-CSCF 1014 and S-CSCF 1016 may be the same entity. Further, an application server 1018, which may provide a call collision handling function, is provided within the network. A call collision handling function/server manages access to resources e.g. microphone, speaker, head unit, visual display unit, etc., in devices, e.g. a vehicle, which can be used for the purposes of supporting only one call/session at a time.

As seen by message 1020 in the embodiment of FIG. 10, the remote UE 1010 performs a first registration procedure with relay UE 1012. In some embodiments, this first registration procedure could also be an association, for example utilizing Bluetooth™ technology or other short range wireless or wired technology. Message 1020 may contain at least one of the Remote UE User ID and/or the Layer-2 ID.

Upon receiving message 1020, relay UE 1012 provides an acknowledgement, which includes the relay UE's ID, its capabilities, and an application server identifier. This is provided back to remote UE in message 1022.

The application server identifier is the identifier of the function or server responsible for managing some capabilities on the relay UE. For example, such a function may include call collision handling.

The identity of the function responsible for managing the capabilities above may be at least one of a user ID, a Fully Qualified Domain Name (FQDN), a Uniform Resource Identifier (URI), a Uniform Resource Name (URN), an IP address, among other options. The identity may, for example, have been configured in the mobile equipment (ME) or Universal Integrated Circuit Card (UICC).

An example of how the identity of the application server maybe coded as a feature tag for the application server ID is shown below with regard to Table 7.

TABLE 7

Example feature tags for Application Server ID

+g.3gpp.ims.relay-app-id feature tag set to Application Server ID (e.g.
+g.3gpp.ims.relay-app-id=address) and or
P-Asserted-Service: urn:urn-7:3gpp-service.ims.relay-app-id Further, the capabilities of the relay UE could be a "ProSe relay service code" where the ProSe relay service codes define a set of capabilities, such as microphones, speakers, displays, among other options. The relay UE user ID can be a Layer-2 ID, a SIP URI or a Tel URI.

The capabilities provided in message 1022 may be one or more indications, such as, but not limited to, microphone availability, speakers availability, visual display availability, video availability, or voice/audio availability.

Relay UE 1012 further sends a second registration message containing at least one of the following indications: (a) that the registration is for the relay UE 1012; (b) the capabilities of the relay UE, such as the microphone, speakers, display, among other options; and/or (c) the remote UE 1010 user identifier. The second registration message may further contain an implicit or explicit indication that the relay UE 1012 is acting as a relay. For example, feature tags such as provided in Table 8 below could be used.

TABLE 8

Example feature tags for Relay indication

+g.3gpp.ims.relay feature tag set to Remote UE User ID (e.g.
+g.3gpp.ims.relay = user@domain.com) and or
P-Asserted-Service: urn:urn-7:3gpp-service.ims.relay-UE
Or could qualify to be layer 3 or layer 2 relay
+g.3gpp.ims.l3relay (l3 stands for layer 3)
+g.3gpp.ims.l2relay(l2 stands for layer 2)

Further, the remote UE User ID could be provided in feature tags. An example showing feature tags for the remote UE's user ID is shown in Table 9 below.

TABLE 9

Example feature tags for Remote UE User ID g.3gpp.ims.remoteUE feature tag set to Remote UE User ID
(e.g. +g.3gpp.ims.remoteUE = user@domain.com, user2@domain.com)
or
(e.g. +g.3gpp.ims.remoteUE = user@domain.com;
+g.3gpp.ims.remoteUE = user2@domain.com;

The second registration to the relay UEs S-CSCF 1016 is shown with arrow 1030.

Upon receiving the second registration during the second registration of arrow 1030, the relay UE's S-CSCF 1016 may then perform a third party register, containing a second registration message. This third party registration, shown with arrow 1032 is then performed with application server 1018. Such third party registration will occur if it has not already been done. For example if the Application Server ID is included in the second registration, the 3$^{rd}$ party registration is sent to the address provided. Further if, for example, a P-Asserted-Service:urn:urn-7:3gpp-service.ims.relay-app-id is used based on configuration information in the S-CSCF 1016, the S-CSCF 1016 sends the 3$^{rd}$ party registration to the configured address for the AS that is associated with the configuration information.

Alternatively, the filter criteria (as defined in 3GPP TS 24.229) may have a first application server address in it. In this case, the third-party registration is sent to that AS. Upon receipt of the 3$^{rd}$ party registration, the first AS determines that an Application Server ID for a 2$^{nd}$ AS is contained within the data received. The first AS may then send the registration message containing the 3$^{rd}$ party registration to the second AS.

After the third party register of arrow 1032, the subscribe information may be provided between the relay UE 1012 and AS 1018, as shown by arrow 1034. Such subscribe messaging can include the relay UE capabilities status. Specifically, a SUBSCRIBE message may be sent to the relay UE 1012. The SUBSCRIBE message may request to be notified about a change in status of a resource, such as the microphone being used, or being free. The relay UE 1012 would typically send a 200 OK message in response to the SUBSCRIBE message.

The AS 1018 may also create a mapping between the URI of the relay UEs' identities received in the third-party registration and the Remote UEs, for example using Table 5 above.

Subsequently, a remote UE may send a third registration message containing at least one of the following indications: (a) that registration is for the remote UE that is identified by a remote UE identifier, where such indication could be implicit or explicit; (b) the user ID of the relay UE; (c) a relay UE user ID and/or (d) an application server ID. This third registration message is sent as message 1040 in the embodiment of FIG. 10 to the remote UE's S-CSCF 1014.

Upon receiving message 1040, remote UE's S-CSCF 1014 may then perform a third-party register, as seen by message 1042, with AS 1018. The third-party register may involve correlating, at AS 1018, the information received in message 1032 with the information in message 1042 to determine that the message 1042 is related to message 1032. Specifically, the AS 1018, upon receipt of message 1042, may compare the relay UE user ID, if received, with the relay UE user ID previously received, and may bind the two identities if not already done. If the two IDs are already bound, the AS 1018 validates the binding.

Figure 11:
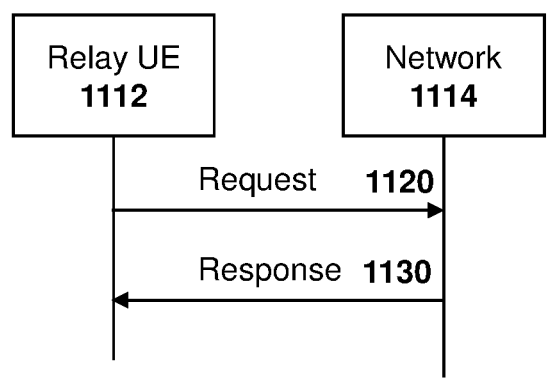
FIG. 11 is a dataflow diagram showing a relay user equipment requesting application server identities.

With regard to the provisioning of application server identities in the relay UE, reference is now made to FIG. 11. The embodiment of FIG. 11 shows message flow for a relay UE requesting application server identities.

In particular, a relay UE 1112 communicates with a network 1114. The relay UE sends a message 1120 to the network. Such message may be, but is not limited to, an attach message, Location Update, Routing Area Update, Tracking Area Update, an IMS method such as, but not limited to, register or subscribe, among other options.

Message 1120 contains an indication that the UE is a relay UE.

In response to message 1120, the relay UE receives a response 1130 from the network 1114. Message 1130 may be any message, including an attach accept, Location Update Accept, Routing Area Update Accept, Tracking Area Update Accept, 200 OK message, a notify message, among other options.

Message 1130 may contain an indication of the address of the application server identities. For example the message may contain identities for any or all of an application server, the STUN address, the TURN address, among other options.

If the message 1130 is an attach accept, it may contain an indication, where the indication may be included in a Protocol Configuration Options (PCO) field.

If message 1130 is a 200 OK or a SIP notify, message 1130 may contain an indication of the application server identities. One example of feature tags for such indication is shown below with regard to Table 10.

TABLE 10

Example feature tags for Application Server ID

+g.3gpp.ims.relay-app-id feature tag set to Application Server ID (e.g. +g.3gpp.ims.relay-app-id=address) and or
P-Asserted-Service: urn:urn-7:3gpp-service.ims.relay-app-id As seen in Table 10 above, the address of the application server ID may be provided.

The application server may perform numerous operations such as managing access to resources e.g. microphones, speakers visual display unit, etc., act as a STUN server, act as a TURN server, among other options. The 200 OK may contain a single address that could be used for the various server types, or alternatively could contain three separate feature tags. For example, the three featured tags may be provided as indicated in Table 11 below.

TABLE 11

Example feature tags for Application Server ID

+g.3gpp.ims.TURN-app-id feature tag set to TURN Server ID (e.g. +g.3gpp.ims.TURN-app-id=address) and or
P-Asserted-Service: urn:urn-7:3gpp-service.ims.TURN-app-id
+g.3gpp.ims.STUN-app-id feature tag set to STUN Server ID (e.g. +g.3gpp.ims.STUN-app-id=address) and or
P-Asserted-Service: urn:urn-7:3gpp-service.ims.STUN-app-id Thus, as indicated above, the three feature tags could be provided separately.

Network 1114 sends response 1130 in response to request 1120. Request 1120, if it contains an indication that the UE is a relay UE and if the network node is configured with the application server address, provides the application server address in the response message.

The address may be provisioned in an external database such as the HSS/HLR database, Policy Control Function, and sent to a network node such as the MSC, MME, P-GW, S-GW, User Plane Function (UPF), Session Management Function (SMF), S-CSCF, among other options, via a message. Such message may, for example, be an Insert Subscriber Data message according to 3GPP TS 29.002, "*Mobile Application Part (MAP) specification*", as for example provided in v.14.3.0, March 2017, or the 3GPP TS 29.272, "Evolved Packet System (EPS); *Mobility Management Entity (MME) and Serving GPRS Support Node (SGSN) related interfaces based on Diameter protocol*", as for example provided in v. 14.3.0, March 2017.

First Mechanism to Determine if Relay UE Resources can be Used

In accordance with a further embodiment, an assumption is made that a registration procedure has already occurred.

For example, the registration procedures of FIG. 9 or FIG. 10 above may have already occurred.

In accordance with the present embodiment, the application server may send tunneled or encapsulated SIP requests or responses to the remote UE via the relay UE. The relay UE may insert in the SIP request or response status of its media capabilities, for example its microphone, speakers, among other options. Upon receipt of the SIP response the remote UE determines if the media should be terminated at the remote UE or at the relay UE.

Figure 12:
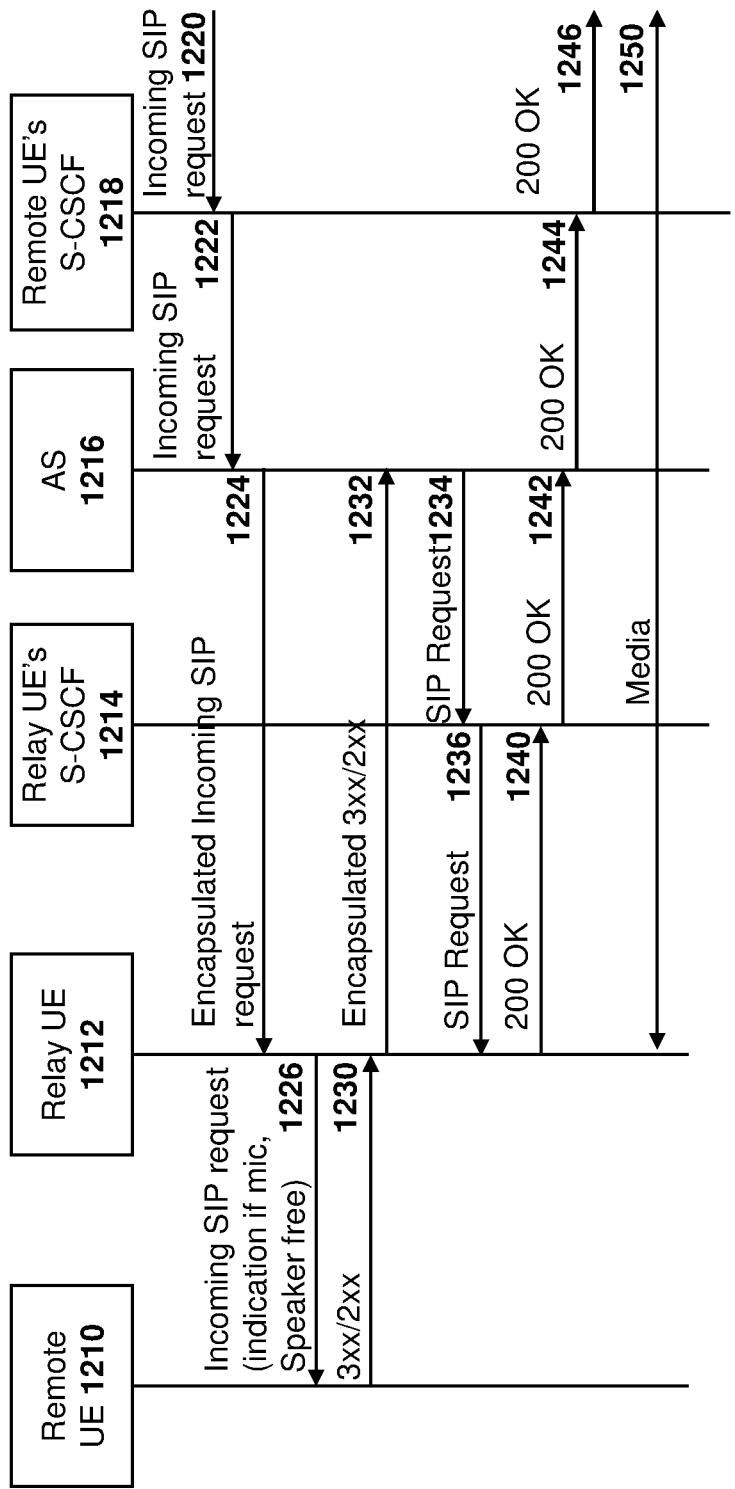
FIG. 12 is a dataflow diagram showing a first embodiment for determining if relay user equipment resources can be used.

Reference is now made to FIG. 12. In the embodiment of FIG. 12, a remote UE 1210 communicates with a relay UE 1212. Further, on the network side a relay UE's S-CSCF 1214 communicates with relay UE 1212. Further, an application server 1216 exists to provide application server functionality. Further, remote UE's S-CSCF 1218 is part of the network. In some embodiments, relay UE's S-CSCF 1214 and remote UE's S-CSCF 1218 may be the same entity.

At message 1220 the remote UE's S-CSCF 1218 receives an incoming SIP request. The remote UE's S-CSCF 1218 then forwards the incoming SIP request to AS 1216 in message 1222. Message 1222 contains a user identity of the remote UE 1210.

For example, an incoming SIP request is provided below in Table 12.

TABLE 12

Example incoming SIP METHOD

INVITE sip:user2_public1@home1.net SIP/2.0
Via: SIP/2.0/UDP icscf2_s.home2.net;branch=z9hG4bK871y12.1, SIP/2.0/UDP
    scscf1.home1.net;branch=z9hG4bK332b23.1, SIP/2.0/UDP
    pcscf1.home1.net;branch=z9hG4bK431h23.1, SIP/2.0/UDP
    [5555::aaa:bbb:ccc:ddd]:1357;comp=sigcomp;branch=z9hG4bKnashds7
Max-Forwards: 67
Route: <sip:scscf1.home1.net;lr>
Record-Route: <sip:scscf1.home2.net;lr>, <sip:pcscf1.home2.net;lr>
P-Access-Network-Info: 3GPP-UTRAN-TDD; utran-cell-id-3gpp=234151D0FCE11
P-Asserted-Identity: "John Doe" <sip:user1_public1@home1.net>, <tel:+1-212-
    555-1111>
P-Charging-Vector: icid-value="AyretyU0dm+6O2lrT5tAFrbHLso=023551024";
    orig-ioi=home1.net
P-Asserted-Service: urn:urn-7:3gpp-service.ims.icsi.mmtel
Accept-Contact: *;+g.3gpp.icsi-ref="urn%3Aurn-7%3gpp-service.ims.icsi.mmtel"
Privacy: none
From: <sip:user1_public1@home2.net>;tag=171828
To: <tel:+1-212-555-2222>
Call-ID: cb03a0s09a2sdfglkj490333
Cseq: 127 INVITE
Supported: 100rel, precondition, gruu, 199
Accept: application/sdp,application/3gpp-ims+xml
Contact: <sip:user1_public1@home1.net;gr=urn:uuid:f81d4fae-7dec-11d0-a765-
    00a0c91e6bf6>;+g.3gpp.icsi-ref="urn%3Aurn-7%3gpp-service.ims.icsi.mmtel">
Allow: INVITE, ACK, CANCEL, BYE, PRACK, UPDATE, REFER, MESSAGE
Content-Type: application/sdp
Content-Length: (...)
v=0
o=- 2987933615 2987933615 IN IP6 5555::aaa:bbb:ccc:ddd
s=-
c=IN IP6 5555::aaa:bbb:ccc:ddd
t=0 0
m=video 3400 RTP/AVP 98 99
b=AS:75
a=curr:qos local none
a=curr:qos remote none
a=des:qos mandatory local sendrecv
a=des:qos none remote sendrecv
a=inactive
a=rtpmap:98 H263
a=fmtp:98 profile-level-id=0
a=rtpmap:99 MP4V-ES
m=audio 3456 RTP/AVP 97 0 96
b=AS:25.4
a=curr:qos local none
a=curr:qos remote none
a=des:qos mandatory local sendrecv
a=des:qos none remote sendrecv
a=rtpmap:97 AMR
a=fmtp:97 mode-set=0,2,5,7; mode-change-period=2
a=rtpmap:96 telephone-event
a=maxptime:20

AS 1216 determines the user identity received at message 1222. For example, such user identity may be the R-URI of the SIP request. Based on this identity, the AS 1216 determines that the identity may be reached at a remote UE. This may be based on functionality described elsewhere in the present disclosure, for example as described above with regard to FIGS. 9 and 10.

The AS may then map the R-URI to the relay UE URI and/or the relay UE IP address. Mapping could contain indications of which URI is a remote UE and which URI is a relay UE.

The AS 1216 may encapsulate the SIP request, for example utilizing the process of FIG. 8 above, into a second SIP request e.g. SIP MESSAGE request. The encapsulation is shown by the second SIP request containing an indication that it contains an encapsulated SIP request e.g. SIP INVITE. For example a content-type is set to a new content type value application such as "VND.3GPP.encapsulated".

The R-URI of the second message is that of the relay UE 1212. The target parameter may be used to indicate the remote UE URI or a feature tag could be used in some embodiments. For example, one feature tag is provided below with regard to Table 13.

TABLE 13

Example feature tags for Remote UE ID's g.3gpp.ims.remoteUE feature tag set to Remote UE User ID
(e.g. +g.3gpp.ims.remoteUE = user@domain.com,
user2@domain.com)

In some embodiments, the encapsulated SIP request could be encrypted. In this case, a further indication may be provided that indicates that the encapsulated encrypted SIP request is provided and this may, for example, be a new content type value such as "VND.3GPP.encapsulated encrypted"

The encapsulated SIP request is then sent as message 1224 to relay UE 1212 and may, for example, be sent via the S-CSCF and/or P-CSCF of the relay UE in some embodiments.

Instead of implementations using a target parameter, a new feature tag instead might be utilized. For example, one such target parameter and/or content type is shown below with regard to Table 14.

TABLE 14

Example incoming SIP METHOD encapsulated in SIP MESSAGE

MESSAGE sip:user2_public2@home1.net;
       Target = sip:user2_public1@home1.net
       SIP/2.0
Via: SIP/2.0/UDP AS1.home2.net; branch=z9hG4bK876ffa3
Max-Forwards: 70
Route: <sip:scscf1.home2.net;lr>
From: <sip: AS1.home2.net>; tag=583558
To: <sip:user2_public2@home2.net>
Call-ID: fy365h43g3f36f3f6fth74g3
Cseq: 888 MESSAGE
P-Asserted-Identity: sip:AS1.home2.net
Request-Disposition: no-fork
Accept-Contact: *;+g.3gpp.smsip;require;explicit
Content-Type: application/vnd.3gpp.ENCAPSULATED
Content-Length: (...)
INVITE sip:user2_public1@home1.net SIP/2.0
Via: SIP/2.0/UDP icscf2_s.home2.net;branch=z9hG4bK871y12.1, SIP/2.0/UDP
    scscf1.home1.net;branch=z9hG4bK332b23.1, SIP/2.0/UDP
    pcscf1.home1.net;branch=z9hG4bK431h23.1, SIP/2.0/UDP
    [5555::aaa:bbb:ccc:ddd]:1357;comp=sigcomp;branch=z9hG4bKnashds7
Max-Forwards: 67
Route: <sip:scscf1.home1.net;lr>
Record-Route: <sip:scscf1.home2.net;lr>, <sip:pcscf1.home2.net;lr>
P-Access-Network-Info: 3GPP-UTRAN-TDD; utran-cell-id-3gpp=234151D0FCE11
P-Asserted-Identity: "John Doe" <sip:user1_public1@home1.net>, <tel:+1-212-
    555-1111>
P-Charging-Vector: icid-value="AyretyU0dm+6O2lrT5tAFrbHLso=023551024";
    orig-ioi=home1.net
P-Asserted-Service: urn:urn-7:3gpp-service.ims.icsi.mmtel
Accept-Contact: *;+g.3gpp.icsi-ref="urn%3Aurn-7%3gpp-service.ims.icsi.mmtel"
Privacy: none
From: <sip:user1_public1@home2.net>;tag=171828
To: <tel:+1-212-555-2222>
Call-ID: cb03a0s09a2sdfglkj490333
Cseq: 127 INVITE
Supported: 100rel, precondition, gruu, 199
Accept: application/sdp,application/3gpp-ims+xml
Contact: <sip:user1_public1@home1.net;gr=urn:uuid:f81d4fae-7dec-11d0-a765-
    00a0c91e6bf6>;+g.3gpp.icsi-ref="urn%3Aurn-7%3gpp-service.ims.icsi.mmtel">
Allow: INVITE, ACK, CANCEL, BYE, PRACK, UPDATE, REFER, MESSAGE
Content-Type: application/sdp
Content-Length: (...)
v=0
o=- 2987933615 2987933615 IN IP6 5555::aaa:bbb:ccc:ddd
s=-
c=IN IP6 5555::aaa:bbb:ccc:ddd
t=0 0
m=video 3400 RTP/AVP 98 99
b=AS:75

TABLE 14-continued

Example incoming SIP METHOD encapsulated in SIP MESSAGE a=curr:qos local none
a=curr:qos remote none
a=des:qos mandatory local sendrecv
a=des:qos none remote sendrecv
a=inactive
a=rtpmap:98 H263
a=fmtp:98 profile-level-id=0
a=rtpmap:99 MP4V-ES
m=audio 3456 RTP/AVP 97 0 96
b=AS:25.4
a=curr:qos local none
a=curr:qos remote none
a=des:qos mandatory local sendrecv
a=des:qos none remote sendrecv
a=rtpmap:97 AMR
a=fmtp:97 mode-set=0,2,5,7; mode-change-period=2
a=rtpmap:96 telephone-event
a=maxptime:20

In the Table 14 above, the features provided in bold are highlighted to show differences between a typical SIP request.

Once relay UE receives message 1224, it may store the data. Further, based on the user identity received, the relay UE may unencapsulate or de-encapsulate or expand the message and send a message 1226 to remote UE 1210. The remote UE 1210 may be identified, for example, utilizing the examples of Table 13 or Table 14, using a target parameter or a feature tag. Other mechanisms as described in the present disclosure may also be used to identify the remote UE.

Further, if the encapsulation was not encrypted then the SIP request can be sent over an IP transport such as User Datagram Protocol (UDP) or Transmission Control Protocol (TCP) or Stream Control Transmission Protocol (SCTP).

In the present embodiment, a resource may be indicated to be free by, for example, utilizing a feature tag such as that described in Table 15 below.

TABLE 15

Example feature tags for Relay UE features that are free g.3gpp.ims.relayfeaturefree= set to relay UE feature that is free
(e.g. + g.3gpp.ims.relayfeaturefree = mic, video, speakers)

Alternatively, an existing header may be used. For example, such header may be a supported field being included in the SIP method with the resource that is free. This is, for example, shown with regard to Table 16 below.

TABLE 16

Example "supported header" for Relay UE features that are free

INVITE sip:user2_public1@home1.net SIP/2.0
........
Privacy: none
From: <sip:user1_public1@home2.net>;tag=171828
To: <tel:+1-212-555-2222>
Call-ID: cb03a0s09a2sdfglkj490333
Cseq: 127 INVITE
Supported: 100rel, precondition, gruu, 199, Mic, Video
......

Conversely, if the encapsulated SIP request was encrypted, the SIP request may be sent encrypted to the remote UE. For example, the sending may use constructs such as those described below in Table 17.

TABLE 17

Example data structure of PC5 Encrypted data

| Encrypted SIP Method | | |
|---|---|---|
| Information Element/Group name | Need | Length |
| Encrypted data Type | M | 1 |
| Resource status | M | 1 |
| Length | M | 2 |
| Encrypted data | M | Variable |

| Resource status | | |
|---|---|---|
| Bit name | Need | Length/ value |
| Resource 1 e.g. Mic | M | 1 bit<br>0 = free<br>1 = in use |
| Resource 1 e.g. Speakers | M | 1 bit<br>0 = free<br>1 = in use |
| Resource 1 e.g. Screen | M | 1 bit<br>0 = free<br>1 = in use |
| etc | | |

Alternatively, a local connection ID, as defined above with regards to FIG. 9, may be utilized.

Remote UE 1210 receives message 1226. It may then use the resource indications within message 1226 to determine if the relay UE 1212 can be used to provide the service contained in the SIP request. If the resources can be used by the relay UE 1212, the remote UE 1210 may send a message containing the user identity of the relay UE. The relay UE user ID could have been obtained using other mechanisms in the present disclosure or could be contained in message 1226.

The SIP response could be, for example, a 3XX response as defined in IETF RFC 3261 containing the relay UE user ID in the contact header field. This may be sent, for example, to relay UE 1212 utilizing message 1230.

Conversely, if the resources cannot be used at the relay UE 1212 but can be used at the remote UE 1210, the remote UE 1210 may send a message 1230 such as a 200 OK containing a response to the received SIP message. Circumstances in which the relay UE may not be available may, for example, include that the relay UE's resources for the requested media are unavailable.

Message 1230, if it contains a 200 OK message, may further contain an SDP answer as described below.

Once message 1230 is received, relay UE 1212 sends the message encapsulated in a second SIP response 1232 to the application server 1216. The R-URI of the second SIP response could be the URI of the application server 1216 obtained from message 1224, for example. Other mechanisms to find the address of the application server are also within the scope of the present disclosure and may for example include some of the embodiments described above.

The encapsulation of response 1232 may further include encrypting the original SIP response and adding a tag such as "application/DND.3GPP.encapsulated encrypted". If not encrypted then the tag may be, for example, "application/DND.3GPP.encapsulated".

On receipt of response 1232, the application server 1216 may check the embedded message. If the embedded message was a 3XX message, the application server can check if the alternate contact address is the same as the relay UE 1212 for the remote UE 1210 that sent the 3XX message. If the relay UE 1212 is the same, then the application server may send a SIP request, shown by message 1234, to S-CSCF 1214 which will send the message to the P-CSCF and then to relay UE 1212 as shown by message 1236.

The AS 1216 acts as a B2BUA for the dialogue. Further, the AS 1216 may include an indication that the SIP request was for a remote UE 1210, but should be terminated at the relay UE 1212. Such request may, for example, use the contents of Table 18 below.

TABLE 18

Example feature tags for Remote UE IDs g.3gpp.ims.remoteUE feature tag set to Remote UE User ID
(e.g. +g.3gpp.ims.remoteUE = user@domain.com,
user2@domain.com)
Or
g.3gpp.ims.remoteUEterminateatrelay feature tag set to Remote UE User ID On receiving message 1236, relay UE 1212 may check to see if an indication is received that the session was originally for a remote UE 1210. In this case, the relay UE 1212 may provide a form of indication such as visual, audio, among other options, which made include the remote UE user identifier.

Further, the relay UE 1212 may send a message to the application server 1216, via the UE's S-CSCF 1214 and perhaps by the P-CSCF, containing the SDP answer with the IP address of the relay UE as the address to be used to send media. This is shown, for example, with messages 1240 and 1242 respectively in the embodiment of FIG. 12.

The application server may then send the message to the S-CSCF of the remote UE, namely S-CSCF 1218, as shown by message 1244 in the embodiment of FIG. 12.

S-CSCF 1218 may then send a message to the originating terminal, as shown by message 1246.

Thereafter, media is established between the originating terminal and the relay UE 1212, shown with arrow 1250 in the embodiment of FIG. 12.

Second Mechanism to Determine if Relay UE Resources can be Used

In a further embodiment of the present disclosure, a check is made to determine if relay UE resources can be used for a remote UE. This mechanism assumes that registration has occurred for the relay UE, as for example described above with regard to FIG. 9 or 10 above.

In accordance with the present embodiment, an application server determines the resources available and the state of the resources on the relay UE. Upon making this determination, the application server routes SIP requests to the relay UE if the relay UE can be used. Otherwise, the application server will tunnel or encapsulate the SIP request to the remote UE via the relay UE.

Figure 13:
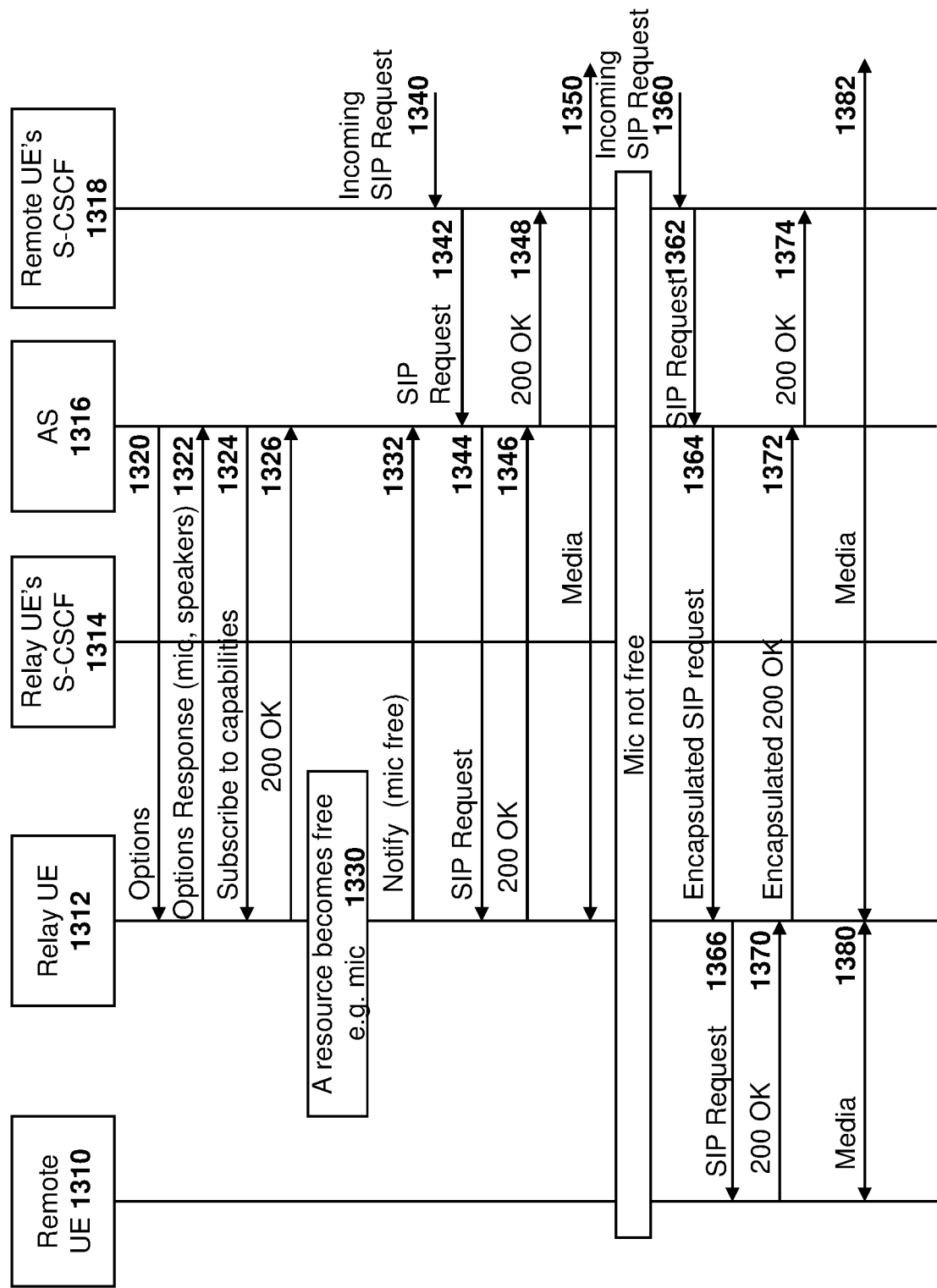
FIG. 13 is a dataflow diagram showing a second embodiment for determining if relay user equipment resources can be used.

Reference is now made to FIG. 13, in which a remote UE 1310 and a relay UE 1312 are located in proximity to each other. Further, a network side includes the relay UE's S-CSCF 1314, an application server 1316 and the remote UE's S-CSCF 1318. In some embodiments, relay UE's S-CSCF 1314 and remote UE's S-CSCF 1318 may be the same entity.

In the embodiment of FIG. 13, the application server 1316 sends a message 1320, such as "SIP OPTIONS" method, via the relay UE's S-CSCF 1314 to the relay UE 1312 to determine the capabilities of the relay UE.

The relay UE 1312 receives message 1320 and sends back an options response message 1322 containing an indication that the relay UE for example has a microphone, speakers, among other options. The coding used could be similar to that of message 1232 of FIG. 12. Alternatively, the coding could be similar to that described in Table 15 or Table 16 above. Other options are also possible.

The application server 1316 receives message 1322 and sends a message 1324 back to the relay UE 1312 to request from the relay UE the status of its capabilities. Such message may, for example, be a SIP subscribe message containing at least one of the capabilities that was received in message 1322.

On receipt of message 1324, the relay UE 1312 sends a 200 OK response message 1326 to application server 1316.

At some point in time, a resource such as the microphone becomes free, as shown by block 1330. The relay UE 1312 may then send a notify message 1332 containing an indication that the resource has become free. Coding could be similar to that described above with regard to message 1322.

Subsequently, the remote UE's S-CSCF 1318 receives an incoming SIP request in message 1340 and forwards this SIP request in message 1342 to the application server 1316. The application server may, based on the state of the media capabilities, make a determination that the relay UE 1312 can handle the SIP request and thus make a choice as to the contact to route the SIP method to. In this case, the SIP request is forwarded to relay UE 1312 in the message 1344. Relay UE 1312 then sends a 200 OK message in message 1346 to AS 1316. AS 1316 may they forward the 200 OK message to the remote UE's S-CSCF 1318 in message 1348.

Thereafter, media may be established between the originating sender and the relay UE 1312, shown with arrow 1350.

Conversely if the microphone was not free when the SIP request arrived, then the choice at the application server may be different. Referring to FIG. 13, an incoming SIP request, shown by message 1360, is provided. However, in this case the microphone on the relay UE is not free.

The incoming SIP request is forwarded to the application server 1316 in message 1362. The application server 1316 then, using the indication that the necessary resources to support the SIP request and SDP received are not available at the relay UE 1312, encapsulates the SIP request. Such encapsulation could be done in accordance with the embodiments previously described. Encapsulated SIP request is provided in message 1364 to the relay UE 1312, which may then unencapsulate or de-encapsulate or extract the message and forward the SIP request to the correct remote UE. The forwarding is done using message 1366.

Remote UE may then send a 200 OK message 1370 back to the relay UE 1312 which may then encapsulate it and provide it to the application server 1316 as message 1372.

The application server 1316 unencapsulates or de-encapsulates or extracts the 200 OK message and forwards it to the remote UE's S-CSCF 1318, shown by message 1374.

Thereafter, media 1380 is provided between remote UE 1310 and relay UE 1312. Further, relay UE may then provide the media to the originating server as shown by arrow 1382.

As with previous embodiments, the "line C" address being determined may utilize at least one of STUN or TURN that are described elsewhere in the present disclosure. Further, the line C address may be an IP address and a port of the relay UE in some cases.

In the embodiment of FIG. 13, the media capabilities can include, but are not limited to the microphone, speakers, screen, keyboard, among other options. Further speakers may be characterized by a number of speakers and the screen may be characterized by screen resolution and supported frame rate.

Third Mechanism to Determine if Relay UE Resources can be Used

In a further embodiment, information flow may be between the remote UE and the relay UE. This mechanism assumes that registration has occurred for the relay UE, as for example described above with regard to FIG. 9 or 10 above.

Figure 14:
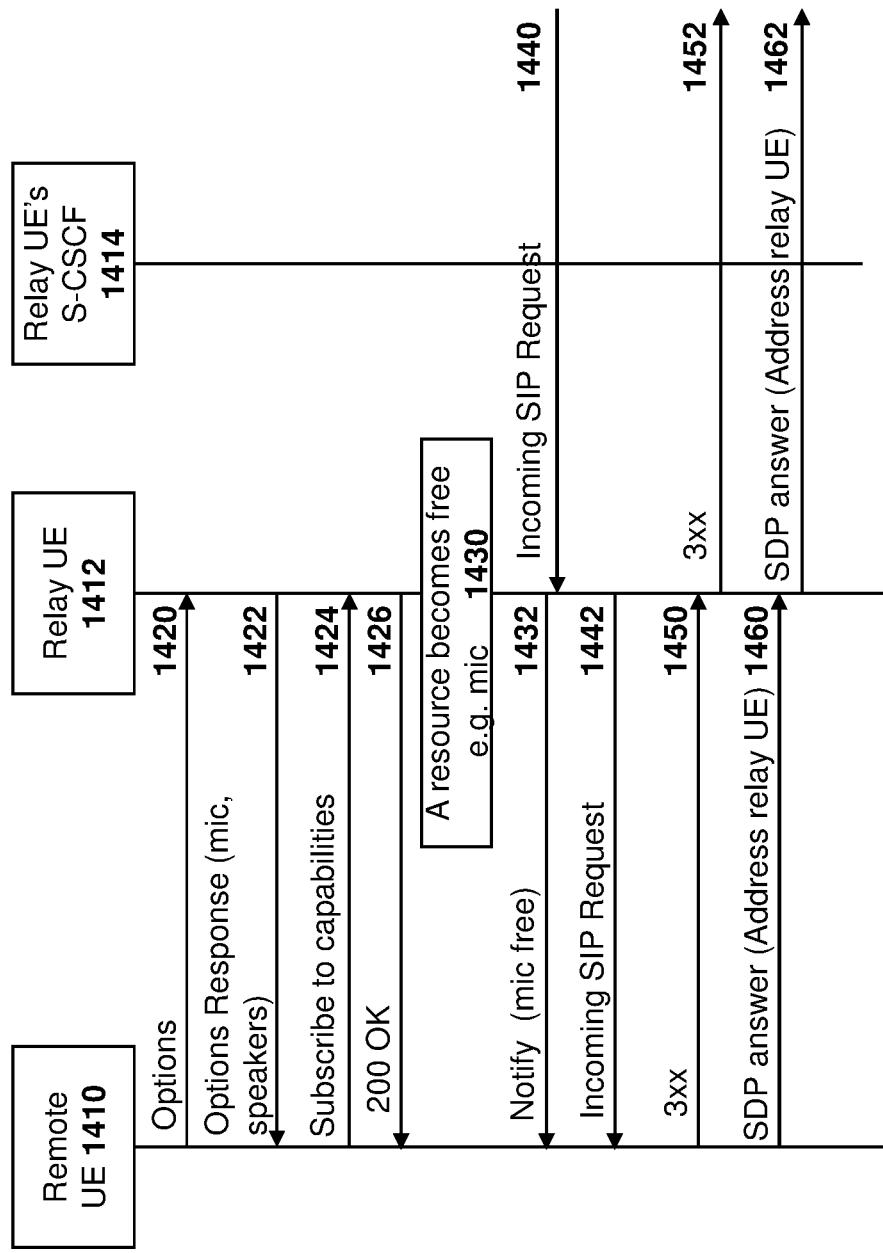
FIG. 14 is a dataflow diagram showing a third embodiment for determining if relay user equipment resources can be used.

Reference is now made to FIG. 14. In the embodiment of FIG. 14, a remote UE 1410 communicates with a relay UE 1412. Further, the relay UE may communicate with the relay UE's S-CSCF 1414.

In the embodiments of FIG. 14, the remote UE 1410 may send a query request such as SIP OPTIONS to the relay UE 1412, shown by message 1420.

The relay UE may provide an options response, which is similar to that of the message 1322 above. This options response is sent as message 1422 back to remote UE 1410. The options response may contain feature tags, such as those for example provided in Table 19 below.

TABLE 19

| Example feature tags for Relay UE features that are supported |
|---|
| g.3gpp.ims.relayfeature= set to relay UE features<br>(e.g. + g.3gpp.ims.relayfeature = mic, video, speakers) |

The remote UE 1410 may then subscribe to the capabilities of the relay UE utilizing message 1424. Message 1424 may be similar to message 1324 from the embodiment of FIG. 13 above.

Relay UE 1412 may respond to the subscribe message with a 200 OK message, as shown by message 1426.

Once a resource becomes free, as is shown by block 1430, the relay UE 1412 may then notify the remote UE 1410 that a resource, for example a microphone, is free, as shown by notification message 1432.

Subsequently, the relay UE 1412 receives an incoming SIP message, shown by message 1440. The relay UE may then forward the incoming SIP message to the remote UE 1410 using message 1442.

In this case, the remote UE 1410 knows that the relay UE has the resources to handle the SIP request and may therefore provide a redirection back in the form of a 3XX message 1450.

The relay UE 1412 may then forward the 3XX message shown by message 1452. Further, in some embodiments instead of the 3XX message, an SDP response 1460 to the incoming SIP request may be made, in which case the SDP answer is forwarded as message 1462 to the originating server.

Again the media capabilities may include, but are not limited to, the microphone, speakers, screen or keyboard. Speakers may further be characterized by the number of speakers. The screen may be further characterized by the screen resolution and supported frame rate. The chosen content may be determined as one of the relay UE or the remote UE.

Further, the "C line" address may be determined using at least one of STUN or TURN as described elsewhere in the present disclosure, or may be determined based on an IP address and port of the relay UE 1412.

In a further option, the remote UE 1410 may monitor the options to find capabilities and provide redirection.

Fourth Mechanism to Determine if Relay UE Resources can be Used

In accordance with a further embodiment, a further mechanism to determine if relay UE resources can be used is provided. This mechanism assumes that registration such as that described in FIG. 9 or 10 above has already been performed.

Figure 15:
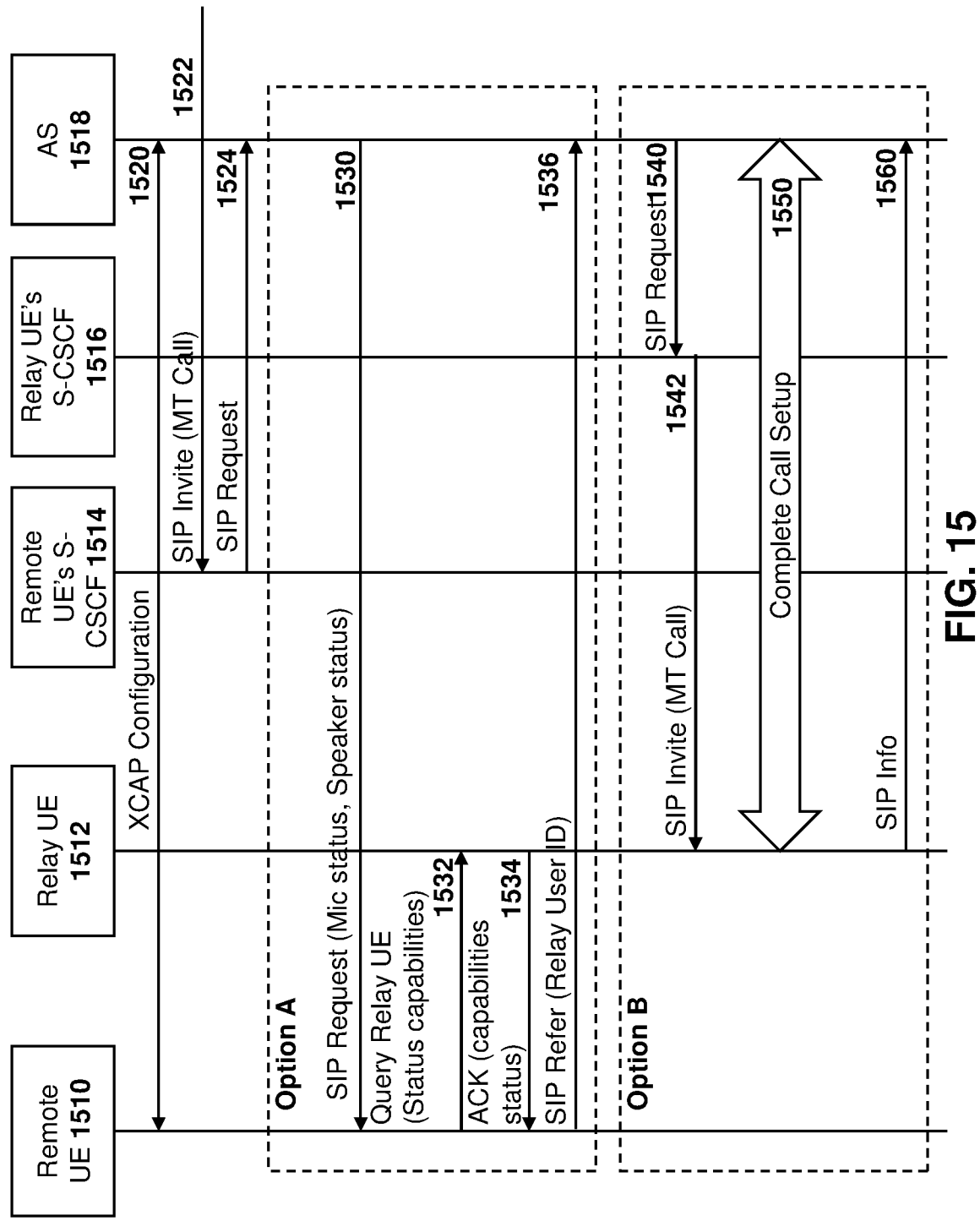
FIG. 15 is a dataflow diagram showing a fourth embodiment for determining if relay user equipment resources can be used.

In the present embodiment, the remote UE 1510 communicates with relay UE 1512. Further, a remote UE's S-CSCF 1514 and a relay UE's S-CSCF 1516 are on the network side. An application server 1518 is also provided in the embodiment of FIG. 15. In some embodiments, relay UE's S-CSCF 1516 and remote UE's S-CSCF 1514 may be the same entity.

Remote UE 1510 configures a collision handling server (e.g. an application server) via an XCAP configuration (e.g. HTTP PUT) to determine whether incoming calls should be routed to the remote UE 1510 or the relay UE 1512. When an incoming call is received in the IMS of the remote UE, the call is routed to the collision handling server, which then routes the call to either the relay UE or the remote UE based on a configuration or for other reasons such as the solutions described below.

Thus, as seen by arrow 1520, during the process of XCAP configuration, the remote UE 1510 may send a message such as an HTTP PUT message, containing a policy on how incoming SIP requests should be routed to the remote UE or the relay UE.

Application server 1518 receives the HTTP PUT message containing the information sent and can store such configuration information.

Subsequently, a SIP invite may be received at the remote UE's S-CSCF 1514. The invite may be received, for example, using message 1522 in the embodiment of FIG. 15.

The remote UE's S-CSCF 1514 forwards the SIP invite as message 1524 to AS 1518. AS 1518 may then make a determination based on the stored information from arrow 1520 on who is to receive the SIP request. In particular, if the remote UE 1510 is to handle the SIP request then the option A illustrated in FIG. 15 may be used. This shows that the SIP request is sent to remote UE 1510 as message 1530. Optional information within message 1530 may include the status of the capabilities at the relay UE 1512.

If the message does not contain the status of the capabilities of the relay UE, a query message 1532 may be sent between the remote UE 1510 and the relay UE 1512 to query the status capabilities of the relay UE. The relay UE 1512 may then send a response 1534 providing the capabilities status.

Based on the status of the capabilities of relay UE 1512, a SIP request containing the relay UE user ID may be provided back to the AS 1518 as message 1536.

Conversely, if the SIP request is to be provided to the relay UE, then AS 1518 may send SIP request 1540 to the relay UE's S-CSCF 1516.

The relay UE's S-CSCF 1516 may then forward the SIP invite in message 1542 to the relay UE 1512.

The relay UE 1512 may then complete the call set up, as shown by arrow 1550, and subsequently the SIP information containing a list of resources that are being used as a result of completing the setup is sent back to the AS 1518 in message 1560. In some cases, such SIP information may indicate that certain resources are not available.

The messaging described above may, in some cases, utilize similar messages to that described in previous embodiments.

Fifth Mechanism to Determine if Relay UE Resources can be Used

In accordance with a further mechanism to determine if the relay UE resources can be used, the mechanism assumes that registration has occurred, for example utilizing the embodiment of FIG. 7 above.

In the current embodiment, the relay UE is inserted in the path of all incoming and outgoing calls or sessions to and from the remote UE. This allows the relay UE to take the decision to route any incoming or outgoing calls or sessions to the remote UE or to process, service or terminate the incoming or outgoing calls or session itself. When processing the media of the call or session, the relay UE may send the media to an output device associated with either itself or with another connected device such as an infotainment system. The output device may, for example, include speakers, visual display units, among other options for output devices.

Figure 16:
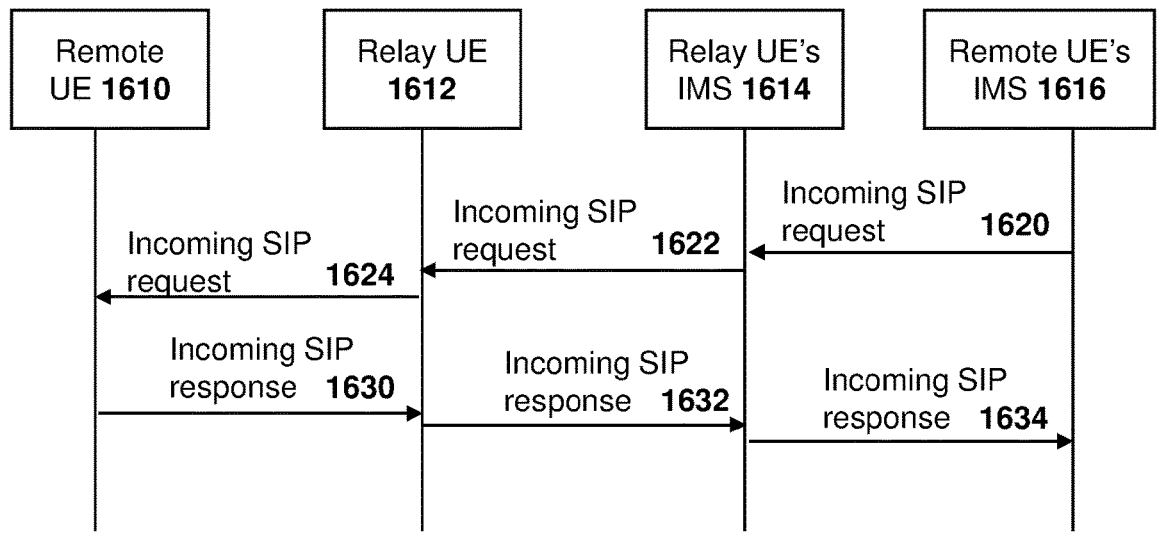
FIG. 16 is a dataflow diagram showing a fifth embodiment for determining if relay user equipment resources can be used for incoming SIP requests.

Reference is now made to FIG. 16, which shows a process for handling incoming SIP requests. When an incoming call or session arrives at the remote UE's IMS, the remote UE's IMS 1616 forwards, proxies or sends the SIP request for the incoming call or session to the relay UE's IMS 1614. The forwarding may be done pursuant to standard SIP/IMS standards such as those defined in the 3GPP TS 23.228 and 3GPP TS 24.229 specifications. The incoming SIP request is forwarded in message 1620 in the embodiment of FIG. 16. In some embodiments, the relay UE's IMS 1614 and the remote UE's IMS 1616 may be the same entity.

Upon receiving message 1620, the relay UE's IMS 1614 may add or include a relay UE indication into the received SIP request to inform the remote UE and/or the relay UE that this SIP request is a SIP request that has been relayed. In other words, the SIP request has not originated from the relay UE's IMS 1614 and further that the call or session is intended to be relayed to remote UE 1610.

The remote UE's IMS 1616 or relay UE's IMS 1614 may be any of a P-CSCF, and I-CSCF, and S-CSCF, or an AS, among other options.

The relay UE indication described above may be a SIP header, a SIP header option, a SIP request body XML, among other options.

The relay UE's IMS 1614 may then forward the received SIP request for the incoming call or session to the relay UE 1612 pursuant to standard SIP/IMS standards, as for example defined in 3GPP TS 23.228 and 3GPP TS 24.229.

Upon receiving message 1622, the relay UE 1612 may detect that the SIP request is not intended for the relay UE. For example, the detection may be done based on a relay UE indication in the message and/or by determining that the SIP request does not address to the relay UE by analyzing the request-URI SIP header. The relay UE 1612 then selects to service or terminate the incoming call/session itself or forward, proxy or send the call or session on to the remote UE to service or terminate, as for example shown by message 1624 in the embodiment of FIG. 16. As will be appreciated by those in the art, message 1624 is omitted if the relay UE decides to service the SIP request itself.

If message 1624 is to be sent, the relay UE 1612 may determine the remote UE 1610 to which to route the call by performing a lookup on the destination IMS/SIP identity. This may include the Tel URI or SIP URI in the "request-URI" SIP header or the "to" SIP header. The relay UE 1612 may then obtain an address of the remote UE 1610, or an interface identity to the relay UE 1610 for which to route messaging to the remote UE, by utilizing a binding. Such binding may have been previously created, for example during the registration process.

If a remote UE 1610 to which to forward the SIP request is determined, then the relay UE 1612 may create or construct a new SIP request using the information from the received SIP request and may perform one or more of the following: (a) The relay UE may exchange, replace, or swap out some or all instances of its own IP address with the remote UE's IP address; and/or (b) the relay UE may add or include a relay UE indication such as a SIP header, SIP header option or SIP request body XML, into the SIP request to inform the remote UE that this SIP request is a SIP request that is being, or has been, relayed. In other words, the SIP request has not originated from the relay UE 1612.

The relay UE 1612 may then send the new SIP request in message 1624 to the remote UE 1610. The relay UE 1612 may also create or construct a binding between the remote UE 1610 and the SIP request that was sent in order to ensure responses received to the SIP request can be relayed or proxied to the correct remote UE's IMS 1616.

The binding could include, but is not limited to, the following factors. If the same Call-ID is included in the SIP request sent to the remote UE 1610, then the relay UE binds the Call-id included in the received SIP request from the remote UE's IMS 1616 to one or more identities of the remote UE 1610 used on the local connection. Such identity may be an IP address of the remote UE used on the local connection, a MAC address belonging to the remote UE used for the local connection, a MAC address belonging to the relay UE used for the local connection, among other options.

The binding could further include information based on whether a different Call-ID is included in the SIP request sent to the remote UE 1610. In this case, the relay UE 1612 may bind the call-ID included in the received SIP request from the remote UE's IMS 1616 to the Call-ID included in the SIP request sent to the relay UE's IMS 1614 and optionally also an identity of the remote UE 1610 used on the local connection. For example, this identity may be an IP address of the remote UE used on the local connection, a MAC address belonging to the remote UE used for the local connection, a MAC address belonging to the relay UE used on the local connection, among other options.

If the remote UE is not found then the relay UE may send an error or SIP response to the remote UE's IMS 1616. For example, such response may be a SIP 410 ("Gone") response.

Upon receiving message 1624, remote UE 1610 may provide a response pursuant to standard procedures. For example, these standard procedures may include those defined in 3GPP TS 24.229. Thus, the remote UE 1610 creates and sends the SIP response such as a SIP 200 OK message to the relay UE 1612 in message 1630. Message 1630 may be referred to as an "incoming SIP response".

Upon receiving the incoming SIP response message 1630 from the remote UE 1610, the relay UE 1612 performs a lookup on the Call-ID in the received SIP response from the relay UE's IMS in the binding store as created above. If the lookup is successful, such that the remote UE is found to be bound to the Call-ID in the received SIP response from the relay UEs IMS, the relay UE 1612 creates or constructs a new SIP response using information from the received SIP response. The relay UE 1612 may further perform one or more of exchanging, replacing or swapping out some of or all instances of its own IP address with the remote UE's IP address.

In addition, or instead, the relay UE 1612 may add or include a relay UE indication such as a SIP header, SIP header option, SIP request body XML, among other options, into the SIP register to inform the remote UE's IMS 1614 that this response has been relayed and has not originated from the relay UE. The relay UE may then send the new SIP response to the relay UE's IMS 1614 in message 1632.

In addition, or instead, the relay UE may exchange replace or swap out some or all instances of the remote UE's International Mobile Equipment Identifier (IMEI) with its own IMEI. The relay UE 1612 may also include an indication of the remote UE's IMEI. This may be done for example in the SIP header, in the XML body of the SIP register, among other options.

Upon receiving the incoming SIP response 1632 from the relay UE 1612, a node in the relay UE's IMS, such as the P-CSCF, the I-CSCF, the S-CSCF, the application server, among other nodes, may then perform various functionality. This may include adding or including a relayed indication. Such relay indication may be added by modifying the same field or information element such as the SIP header, the SIP header option, the SIP request body XML, among other options, as the relay UE indication in the SIP request. Alternatively, the indication may be done by adding or including a new field information element such as a SIP header, SIP header option, SIP request body XML, among other options, in the incoming SIP response 1634.

The indication may be forwarded in an incoming SIP response 1634 to a node in the remote UE's IMS 1616. Such remote UE's IMS may include the P-CSCF, the I-CSCF, the S-CSCF, the AS, among other options. The forwarding may be done using standard procedures such as those defined in the 3GPP TS 24.229 specification.

Upon receiving the incoming SIP response 1634 from the relay UE's IMS 1614, the remote UE's IMS 1616 may then forward, proxy or send the SIP response onto the originator of the call or session. After this, the call or session may then proceed.

Based on the above, for incoming calls or sessions to a remote UE 1610 that has registered via a relay UE 1612, the relay UE 1612 may select between different alternatives for routing and terminating or servicing an incoming call or session. These can include the following five embodiments, which may be used individually or in conjunction with each other.

In a first embodiment, the relay UE 1612 may prompt the user, for example using a display to show the message on a screen, or an audible alert or a vibration, of the call or session as to whether to use the infotainment system or the remote UE 1610 to process the media of the call or session.

In the second embodiment, the relay UE 1612 may make a decision based on some configuration in the relay UE 1612. For example, if the remote UE 1610 is set to prefer to use the infotainment system, then the relay UE 1612 may choose to handle a call itself. The configuration could be provided using a setting on a device configurable by a user interface, a remote provisioning system such as a device management server, among other options.

In a third embodiment, the relay UE 1612 may make a decision based on the availability of its own input or output resources, the input or output resources of the associated infotainment systems, and/or the input or output resources for the destination or remote UE 1610. If the infotainment system is already terminating or servicing a call then the route of the incoming call or session may be to the destination remote UE 1610.

In a fourth embodiment, the relay UE 1612 may make a decision based on the capability to process the type of call or session, which may be based on the currently negotiated media of the call or session. The decision may be based on the capabilities of the relay UE 1612, the associated infotainment systems, and/or the destination remote UE 1610.

In a fifth embodiment, the relay UE 1612 could make a decision based on the current state of the associated vehicle. For example, if the vehicle is being driven, then an incoming video call may be preferred to be sent to a heads up display.

Figure 17:
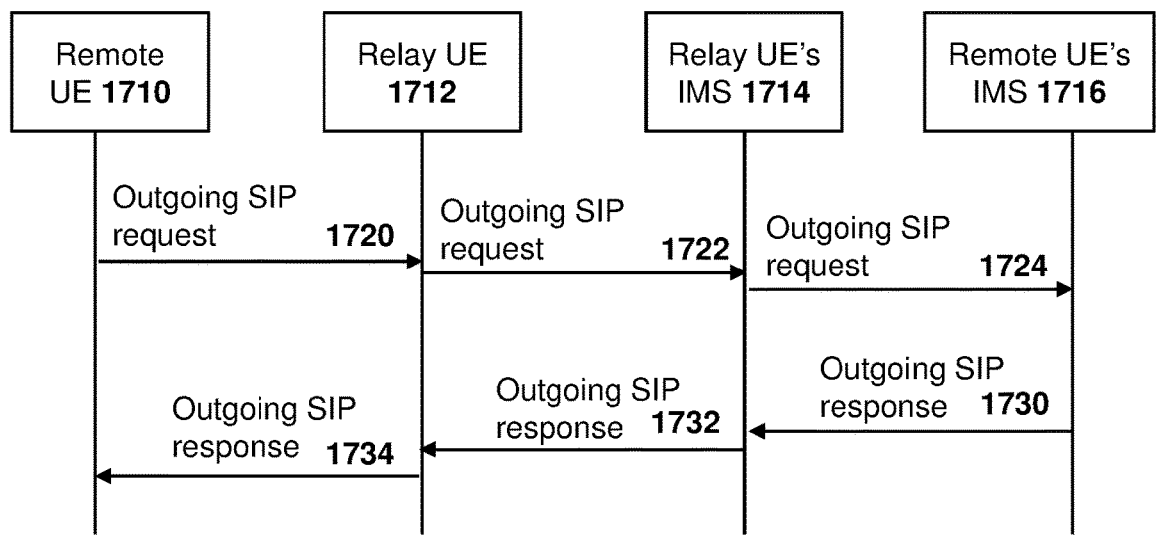
FIG. 17 is a dataflow diagram showing a fifth embodiment for determining if relay user equipment resources can be used for outgoing SIP requests.

With regard to outgoing calls or sessions, reference is now made to FIG. 17. The embodiment of FIG. 17 provides for an outgoing call or session destined to an endpoint beyond the remote UE's IMS, where the remote UE has previously registered to the relay UE such as by the embodiment of FIG. 7 above.

The outgoing SIP request could include any one of, but is not limited to, a SIP Invite, a SIP Update, a SIP Message, or SIP Options. Alternatively the outgoing SIP method in the SIP request could be any new SIP method.

In the embodiment of FIG. 17, remote UE 1710 is the originator of the outgoing SIP request. Further, relay UE 1712 may be used for relaying SIP messages. The relay UE's IMS is shown at block 1714 and the remote UE's IMS is shown in block 1716. In some embodiments, the relay UE's IMS 1714 and the remote UE's IMS 1716 may be the same entity.

An outgoing SIP request 1720 is sent to from the remote UE 1710 to the relay UE 1712 via a local connection.

Upon receiving the SIP request at message 1720, the relay UE 1712 may create or construct a new SIP request using the information from the received SIP request, and may perform one or more of the following. The relay UE may exchange, replace, or swap out some or all instances of the remote UE's IP address with its own IP address. The relay UE may further include a relay UE indication such as a SIP header, SIP header option, SIP request body XML, among other options, into the SIP request to inform the remote UE's IMS that this SIP request is a SIP request that is being relayed. In other words, the SIP request has not originated from the relay UE. The relay UE may further, or instead, exchange, replace, or swap out some or all instances of the remote UE's IMEI with its own IMEI, and may also include an indication of the remote UE's IMEI. This further indication may be provided in a SIP header, in the XML body of the SIP request, among other options.

The relay UE 1712 may then send the new SIP request in message 1722 to the relay UE's IMS 1714. The relay UE's IMS may be a P-CSCF, I-CSCF, S-CSCF, or an AS among other options. It may further be any node, host entity, SIP server or SIP proxy in a network.

The relay UE 1712 may also create a binding between the remote UE and the SIP request that was sent in message 1722 in order to ensure responses received to the SIP request can be relayed or proxied to the correct remote UE 1710. The binding could include, but is not limited to, various techniques. If the first Call-ID is included in the SIP request sent to the relay UE's IMS 1714 then the relay UE 1712 may bind the Call-ID included in the received SIP request from the remote UE 1710 to one or more identities of the remote UE 1710 used on the local connection. For example, this may be an IP address of the remote UE used on the local connection, a MAC address belonging to the remote UE used for the local connection, a MAC address belonging to the remote UE used on the local connection, among other options.

In other embodiments, the binding may differ if the Call-ID included in the SIP request sent to the remote UE's IMS 1716 is different. In this case, the relay UE 1712 may bind the Call-ID included in the received SIP request from the remote UE 1710 to the Call-ID included in the SIP request sent to the relay UE's IMS 1714 and optionally also an identity of the remote UE 1710 used on the local connection. For example, this may be the IP address of the remote UE 1710 used on the local connection, a MAC address belonging to the remote UE used for the local connection, a MAC address belonging to the relay UE used on the local connection, among other options.

Upon receiving the SIP request at message 1722, a node in the relay UE's IMS 1714 may perform a verification or check that the relay UE 1712 is permitted to perform the function of a relay UE. The determination may be based on the receipt of a relay UE indication in the SIP request. If the check is performed and the relay UE is not allowed to perform the role of a relay UE, then an error or response may be sent back to the relay UE 1712.

Conversely, if the check is performed and the relay UE 1712 is permitted to perform the role of a relay UE, or if the check is not performed, then the same node or another node in the relay UE's IMS 1714 may add a relayed indication, which may be done by either modifying the same field or information element, such as a SIP header, a SIP header option, a SIP request body XML, among other options as the relay UE indication in the SIP request, or it may be done by adding or including a new field or information element such as a SIP header, a SIP header option, a SIP request body XML, among other options in the SIP request.

The relay UE's IMS 1714 may then forward the received SIP request, including any modifications, to a node in the remote UE's IMS 1716. Such node may be the P-CSCF, the I-CSCF, the S-CSCF, the AS, among other options. The outgoing SIP message may be sent in message 1724 in the embodiment of FIG. 17.

On receipt of message 1724, the remote UE's IMS 1716 may check that the remote UE 1710 is permitted to use a relay UE, which may be performed due to receiving a relayed indication in the SIP request. If the check is performed and the use of the relay UE is prohibited, then an error or response may be sent back to the relay UE's IMS 1714.

Conversely, if the check is performed and the remote UE is permitted to use the relay UE, or if the check is not performed, for example because the check was previously performed during registration, or at another time and stored, then the remote UE's IMS 1716 may process the SIP request utilizing standard procedures. For example, the IMS may send the outgoing SIP request to the receiver, destination or endpoint of the call or session. When a SIP response is received from the endpoint, or if the remote UE's IMS 1716 generates a SIP response itself, for example due to a timer expiration, an error condition occurring, among other factors, the remote UE's IMS 1716 may send the received or generated SIP response to the relay UE's IMS 1714 as shown by message 1730. Such message may be sent pursuant to procedures defined in 3GPP TS 24.229, for example.

In response to receiving the SIP response, the relay UE's IMS 1714 may forward the received SIP response to the relay UE 1712 in message 1732 utilizing standard procedures as defined, for example, in 3GPP TS 24.229.

Once relay UE 1712 receives message 1732, it may perform a lookup on the Call-ID in the received SIP response from the relay UE's IMS in the binding store. The lookup compares the Call-ID with the information stored after receiving message 1720. If the look up is successful, then the relay UE 1712 may construct a new SIP response using the information from the received SIP response and may perform various functionality. This may include exchanging some or all instances of its own IP address with the remote UE's IP address. It may further include, or may instead include, adding a relay UE indication such as a SIP header, a SIP header option, a SIP request body XML, among other options, into the SIP request to inform the remote UE 1710 that this SIP response is a SIP response that is being relayed. In other words, the SIP response has not originated from the relay UE 1712.

The relay UE may then send the new SIP response to remote UE 1710 in message 1734.

After the above messaging is completed, the call or session may then go ahead.

At the relay UE 1712, various processes may be used to select whether to service or forward the outgoing call or session. For outgoing calls or sessions, a node or element from which the call or session was initiated could perform one of five tasks. These could be performed in conjunction with each other or separately from each other.

In a first embodiment, the relay UE 1712 may prompt the user of an incoming or outgoing call or session on whether to use the infotainment system or the remote UE 1710 to process the media of the call or session. The prompt may be a display on a message screen, an audible alert, a vibration, among other options.

In a second embodiment, the relay UE 1712 may make a decision based on some configuration of the relay UE 1712. This can include a configuration that the remote UE 1710 prefers using the infotainment system, or such configuration could be provided by using settings on a user interface, a remote provisioning system such as a device management server, among other options.

In a third embodiment, the relay UE 1712 may make a decision based on the availability of its own input or output resources and/or the input or output resources of other elements including infotainment systems or the destination remote UE 1710. For example, if the infotainment system is already terminating another call, then the call may be routed to the remote UE 1710.

In a fourth embodiment, the relay UE 1712 may make a decision based on the capability to process the type of call or session that is being made. For example, the processing may consider the capabilities of the relay UE 1712, the associated infotainment systems, the destination remote UE 1710, among other elements in the system.

In a fifth embodiment, the relay UE 1712 may make a decision based on the current state of the associated vehicle. For example, if the vehicle is being driven then different behavior may occur.

The remote UE 1710, relay UE 1712 and infotainment systems associated with the relay UE 1712 could be limited to initiating only certain types of calls or sessions. For example, calls or sessions may be limited to calls and/or sessions to a Public Service Access Point (PSAP) e.g. emergency calls, eCalls, eSMS messaging, location information reporting sessions, among other options. Such limitations may be based on configurations.

For outgoing calls or sessions initiated from the relay UE 1712 or infotainment system on behalf of a remote UE 1710, the relay UE 1712 can route the call or session to or from the IMS/SIP core and network.

Media Routing

The embodiments above may be accomplished utilizing various techniques. In one embodiment, the port and IP address of the relay UE may be determined by sending a STUN binding request to a STUN server address. The IP address or port number may then be used in SDP offers and answers as candidates to send media to when media is to be routed to the remote UE.

In other embodiments, a TURN server may be utilized whereby the port and IP address of the TURN server may be determined by sending TURN allocate messages. In this case, the port and IP address of the TURN server may be used in SDP offers and answers to route the media to the remote UE.

Figure 18:
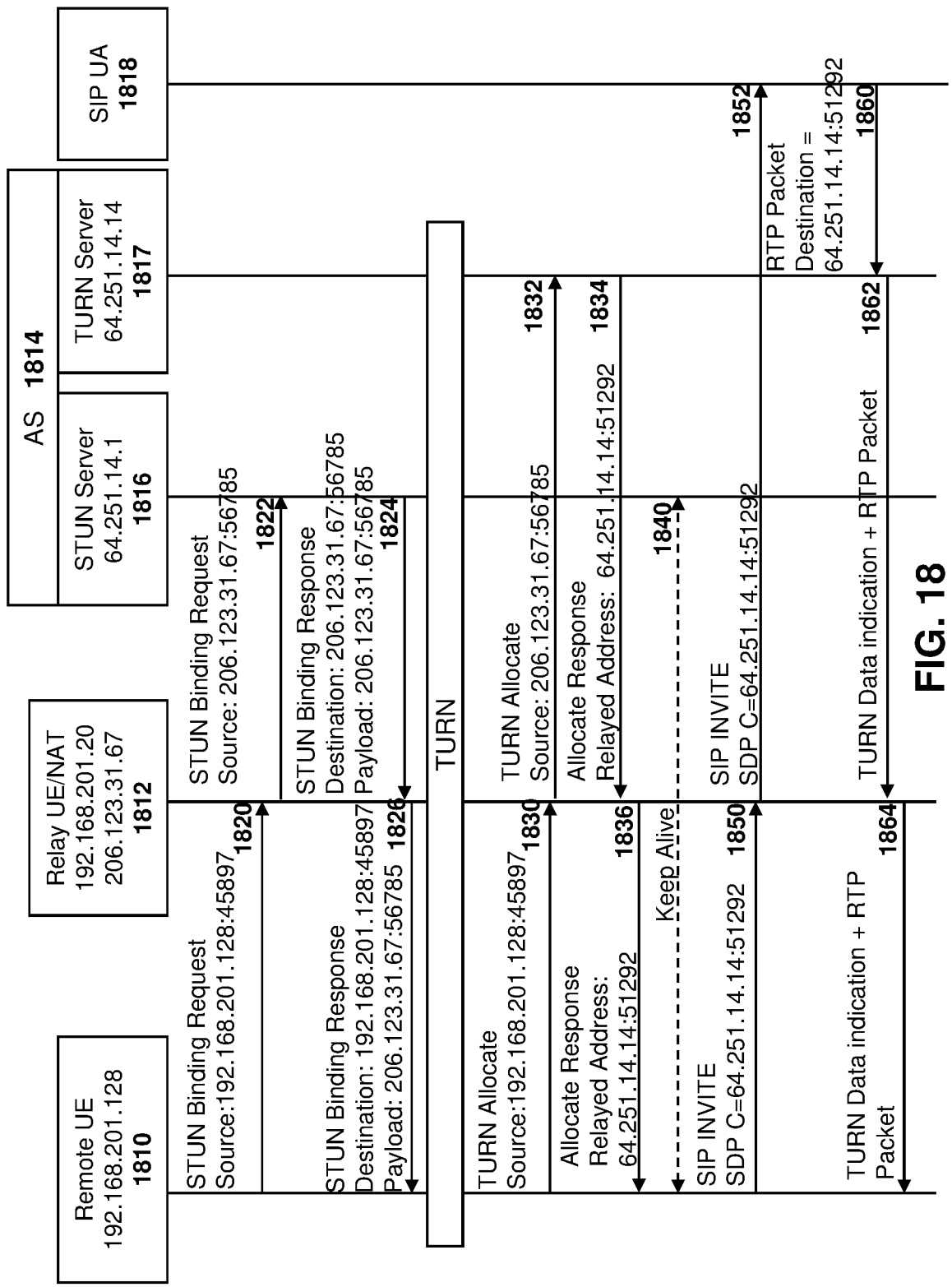
FIG. 18 is a dataflow diagram showing media routing utilizing STUN and TURN for IMS over relay user equipment.

Reference is now made to FIG. 18, which shows a mobile originated SIP request. The techniques of FIG. 18 could equally be used with an SDP answer that contains "C line".

Therefore, in accordance with FIG. 18, once the remote UE 1810 has connectivity with the relay UE 1812, as for example described in the other embodiments of this disclosure, the remote UE 1810 may send a STUN binding request to the relay UE 1812. The STUN binding request is shown as message 1820. In message 1820, the STUN server address may either be statically or dynamically provisioned.

Once the relay UE 1812 receives message 1820, if the remote UE 1810 is permitted to use relay UE 1812 and permitted to use STUN, then the relay UE 1812 sends message 1822, which comprises message 1820 with a source IP address of the relay UE 1812, to an application server 1814. In this case, application server 1814 includes a STUN server 1816 and may include a TURN server 1817.

Application server 1814 sends a STUN binding response 1824 containing the source IP address received in the STUN binding request 1822 as a STUN payload address.

The relay UE 1812 receives message 1824 and sends the message as message 1826 to remote UE 1810. Remote UE then receives the message 1826.

After receiving message 1826, the remote UE knows the SDP "C line" to use for future SDP offers and answers. In other words, the remote UE knows the STUN payload address.

While the above shows the STUN server is part of the AS 1814, in other embodiments, the STUN server could be part of relay UE 1812.

Once the remote UE has connectivity with the relay UE 1812 as described in the other embodiments above, remote UE 1810 may then send a TURN allocate message 1830 to relay UE 1812. The TURN server address may either be statically or dynamically provisioned. The provisioning may, for example, be done using the embodiments described above.

The relay UE 1812 then receives the TURN allocate message 1830.

Upon receipt of message 1830, if the remote UE is permitted to use the relay UE and permitted to use TURN, then the relay UE 1812 forwards message 1830 to the AS 1814, shown as message 1832 in the embodiment of FIG. 18.

AS 1814 through TURN server 1817 sends an allocate response message 1834 containing the IP address and port for the TURN application server. This is sent to relay UE 1812, which may then send the message to remote UE 1810 as shown the message 1836.

After this, the TURN session is configured and keep alive messages shown by message 1840 may be provided until a SIP session is required.

Subsequently, remote UE 1810 provides a SIP invite message 1850. The SIP invite contains an SDP offer with a C line equal to the TURN server address and port, as received in the message 1836. The SIP Invite is sent in message 1850 to relay UE 1812 and is then forwarded in message 1852 to the SIP UA 1818.

RTP packets may then be returned, as shown in message 1860 to the TURN server 1817 and from TURN server the message 1862 may be sent to relay UE 1812.

From relay 1812, a TURN data indication plus RTP packet may be sent in message 1864 to the remote UE 1810.

Those skilled in the art will appreciate that the methods and embodiments described above may be mixed to create additional methods.

Further, where reference is made to an indication or indicator it could be any of the following as provided in Table 20 below.

TABLE 20

Possible ways to convey indication/indicator

| Embodiment | Comment |
| --- | --- |
| Feature tag | The feature tag could have a variable aspect e.g. featuretag = xyz where xyz is the variable aspect of the feature tag. |
| header field parameter | See feature tag |
| Media feature tag | See feature tag |
| SIP URI parameter | |
| New SIP header field | |
| XML Body | |
| New parameter in an existing header | |
| Information element | |

An indicator could be Boolean in nature or take on variable values.

Further, coding used in various embodiments above could use, but is not limited to, the implementation of Table 21 below.

TABLE 21

Example coding implementations

| | |
| --- | --- |
| Relay UE indication | +g.3gpp.ims.relay = Relay UE user ID |
| L2 Relay UE indication | +g.3gpp.ims.l2relay = Relay UE user ID |
| L3 Relay UE indication | +g.3gpp.ims.l3relay = Relay UE user ID |
| Remote UE User ID | +g.3gpp.ims.remoteUE = Remote UE user $ID_1$, Relay UE user $ID_2$ |
| Application Server ID | +g.3gpp.ims.relay-app-id=address |
| Relay feature free | + g.3gpp.ims.relayfeaturefree= set to relay UE feature that is free |

TABLE 21-continued

Example coding implementations

| | |
|---|---|
| STUN Application Server ID | +g.3gpp.ims.STUN-app-id=address |
| TURN Application Server ID | +g.3gpp.ims.TURN-app-id=address |

Further, some embodiments above indicate a first SIP request or response is encapsulated in the second SIP request or response. The solution usually describes the second SIP request as being a SIP MESSAGE method. However, it can equally be a SIP Info or SIP Update. SIP methods include both originating messages and their responses.

In the above embodiments, feature tag names, code point values and their names are just used for illustration purposes and are not absolute.

The construct "+g.3gpp.something" is used in the tables above. The construct is typically used in feature tags that can be included in SIP fields and are allowed to carry such syntactic information such as the contact header, accept-contact header, feature-caps header or using any of the mechanisms in Table 20 above.

The modules and user equipments and devices described above may be any computing device or network node. Such computing device or network node may include any type of electronic device, including but not limited to, mobile devices such as smartphones or cellular telephones. Examples can further include fixed or mobile user equipments, such as internet of things (IoT) devices, endpoints, home automation devices, medical equipment in hospital or home environments, inventory tracking devices, environmental monitoring devices, energy management devices, infrastructure management devices, vehicles or devices for vehicles, fixed electronic devices, among others. Vehicles includes motor vehicles (e.g., automobiles, cars, trucks, buses, motorcycles, etc.), aircraft (e.g., airplanes, unmanned aerial vehicles, unmanned aircraft systems, drones, helicopters, etc.), spacecraft (e.g., spaceplanes, space shuttles, space capsules, space stations, satellites, etc.), watercraft (e.g., ships, boats, hovercraft, submarines, etc.), railed vehicles (e.g., trains and trams, etc.), and other types of vehicles including any combinations of any of the foregoing, whether currently existing or after arising.

Figure 19:
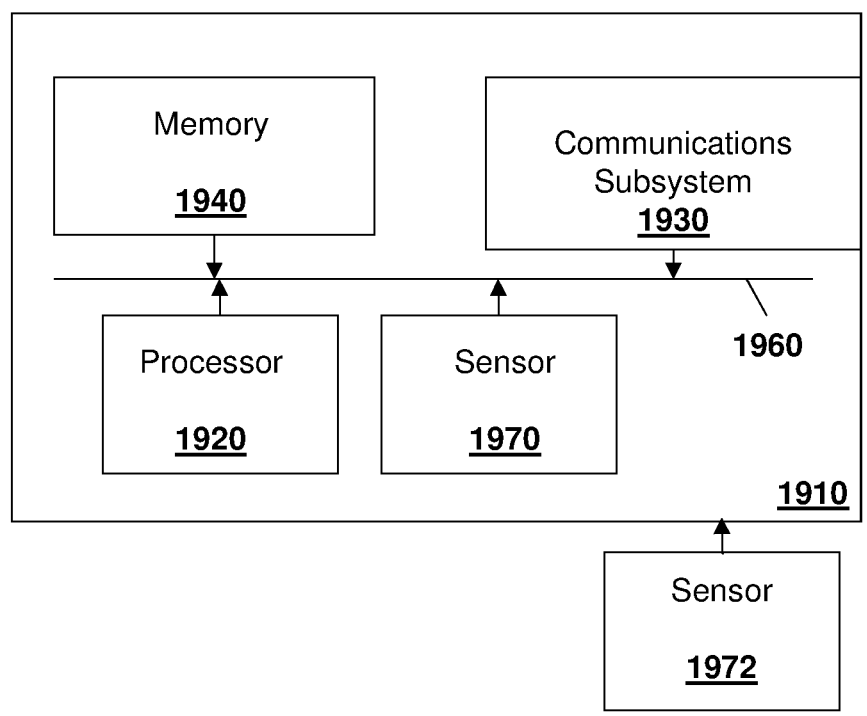
FIG. 19 is a block diagram of a simplified electronic device capable of being used with the methods and systems herein according to one embodiment.

One simplified diagram of a computing device is shown with regard to FIG. 19. The computing device of FIG. 19 could be any UE, S-CSCF, P-CSCF, I-CSCF, TURN server, STUN server, AS, or other node as described above.

In FIG. 19, device 1910 includes a processor 1920 and a communications subsystem 1930, where the processor 1920 and communications subsystem 1930 cooperate to perform the methods of the embodiments described above. Communications subsystem 1920 may, in some embodiments, comprise multiple subsystems, for example for different radio technologies.

Processor 1920 is configured to execute programmable logic, which may be stored, along with data, on device 1910, and shown in the example of FIG. 19 as memory 1940. Memory 1940 can be any tangible, non-transitory computer readable storage medium. The computer readable storage medium may be a tangible or in transitory/non-transitory medium such as optical (e.g., CD, DVD, etc.), magnetic (e.g., tape), flash drive, hard drive, or other memory known in the art.

Alternatively, or in addition to memory 1940, device 1910 may access data or programmable logic from an external storage medium, for example through communications subsystem 1930.

Communications subsystem 1930 allows device 1910 to communicate with other devices or network elements and may vary based on the type of communication being performed. Further, communications subsystem 1930 may comprise a plurality of communications technologies, including any wired or wireless communications technology.

Communications between the various elements of device 1910 may be through an internal bus 1960 in one embodiment. However, other forms of communication are possible.

Further, if the computing station is a user equipment, one example user equipment is described below with regard to FIG. 20.

User equipment 2000 may comprise a two-way wireless communication device having voice or data communication capabilities or both. User equipment 2000 generally has the capability to communicate with other computer systems. Depending on the exact functionality provided, the user equipment may be referred to as a data messaging device, a two-way pager, a wireless e-mail device, a smartphone, a cellular telephone with data messaging capabilities, a wireless Internet appliance, a wireless device, a mobile device, an embedded cellular modem or a data communication device, as examples.

Where user equipment 2000 is enabled for two-way communication, it may incorporate a communication subsystem 2011, including a receiver 2012 and a transmitter 2014, as well as associated components such as one or more antenna elements 2016 and 2018, local oscillators (LOs) 2013, and a processing module such as a digital signal processor (DSP) 2020. As will be apparent to those skilled in the field of communications, the particular design of the communication subsystem 2011 will be dependent upon the communication network in which the user equipment is intended to operate.

Network access requirements will also vary depending upon the type of network 2019. In some networks, network access is associated with a subscriber or user of the user equipment 2000. A user equipment may require an embedded or a removable user identity module (RUIM) or a subscriber identity module (SIM) card or a UMTS SIM (USIM) in order to operate on a network. The USIM/SIM/RUIM interface 2044 is normally similar to a card-slot into which a USIM/SIM/RUIM card can be inserted and ejected. The USIM/SIM/RUIM card can have memory and hold many key configurations 2051, and other information 2053 such as identification, and subscriber related information. In other cases, rather than a network 2019, user equipment 2000 may communicate with a non-access node, such as a vehicle, roadside infrastructure, another user equipment, or other peer-to-peer communication.

When required network registration or activation procedures have been completed, user equipment 2000 may send and receive communication signals over the network 2019. As illustrated in FIG. 20, network 2019 can include multiple base stations communicating with the mobile device.

Signals received by antenna 2016 through communication network 2019 are input to receiver 2012, which may perform such common receiver functions as signal amplification, frequency down conversion, filtering, channel selection and the like. Analog to digital (A/D) conversion of a received signal allows more complex communication functions such as demodulation and decoding to be performed in the DSP 2020. In a similar manner, signals to be transmitted are processed, including modulation and encoding for example, by DSP 2020 and input to transmitter 2014 for digital to analog (D/A) conversion, frequency up conversion, filtering, amplification and transmission over the communication network 2019 via antenna 2018. DSP 2020 not only processes communication signals, but also provides for receiver and transmitter control. For example, the gains applied to communication signals in receiver 2012 and transmitter 2014 may be adaptively controlled through automatic gain control algorithms implemented in DSP 2020.

User equipment 2000 generally includes a processor 2038 which controls the overall operation of the device. Communication functions, including data and voice communications, are performed through communication subsystem 2011. Processor 2038 also interacts with further device subsystems such as the display 2022, flash memory 2024, random access memory (RAM) 2026, auxiliary input/output (I/O) subsystems 2028, serial port 2030, one or more keyboards or keypads 2032, speaker 2034, microphone 2036, other communication subsystem 2040 such as a short-range communications subsystem or DSRC subsystem, and any other device subsystems generally designated as 2042. Serial port 2030 could include a USB port, On-Board Diagnostics (OBD) port or other port known to those in the art.

Figure 20:
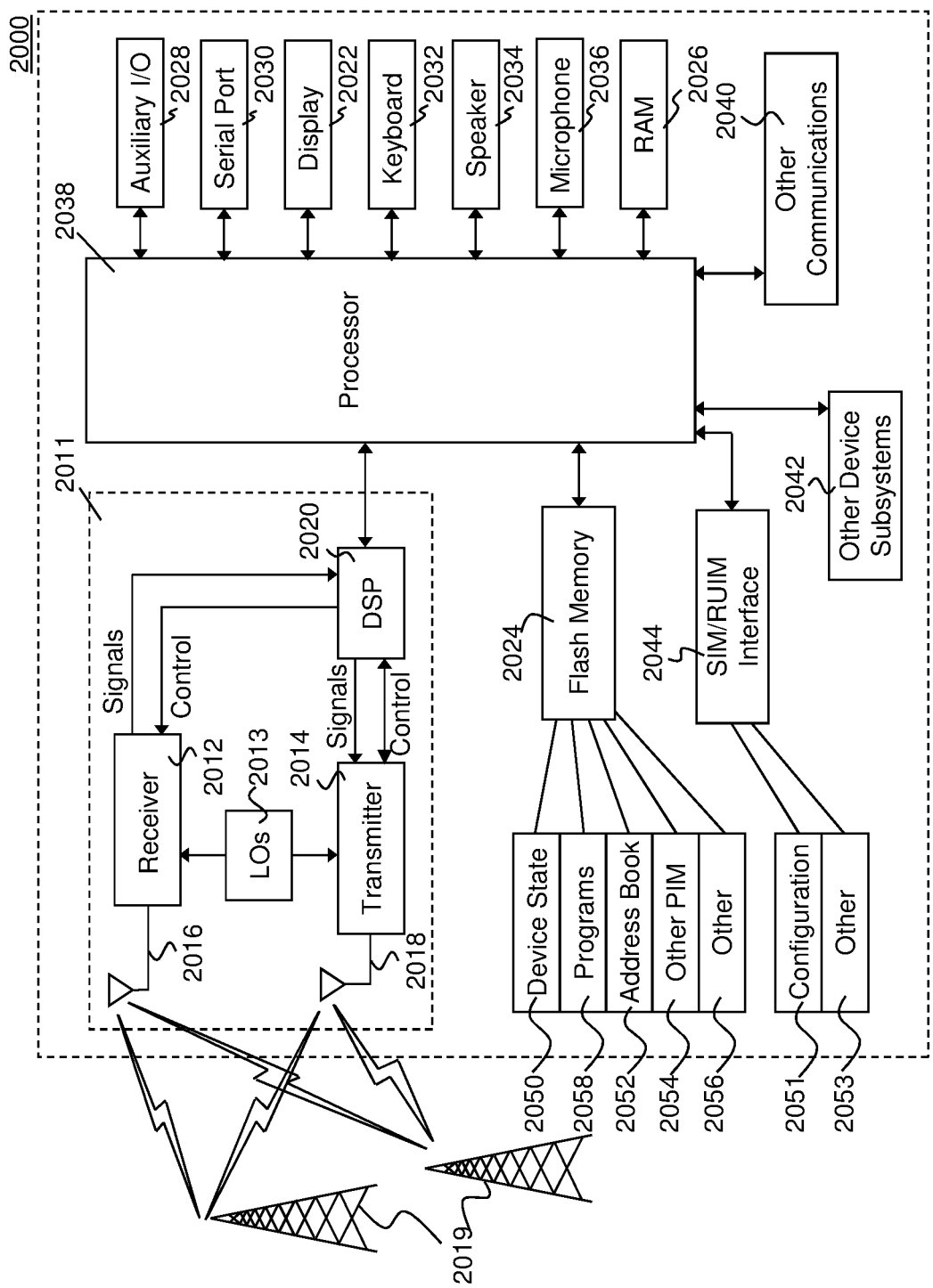
FIG. 20 is a block diagram of a mobile device according to one embodiment.

Some of the subsystems shown in FIG. 20 perform communication-related functions, whereas other subsystems may provide "resident" or on-device functions. Notably, some subsystems, such as keyboard 2032 and display 2022, for example, may be used for both communication-related functions, such as entering a text message for transmission over a communication network, and device-resident functions such as a calculator or task list.

Operating system software used by the processor 2038 may be stored in a persistent store such as flash memory 2024, which may instead be a read-only memory (ROM) or similar storage element (not shown). Those skilled in the art will appreciate that the operating system, specific device applications, or parts thereof, may be temporarily loaded into a volatile memory such as RAM 2026. Received communication signals may also be stored in RAM 2026.

As shown, flash memory 2024 can be segregated into different areas for both computer programs 2058 and program data storage 2050, 2052, 2054 and 2056. These different storage types indicate that each program can allocate a portion of flash memory 2024 for their own data storage requirements. Processor 2038, in addition to its operating system functions, may enable execution of software applications on the user equipment. A predetermined set of applications that control basic operations, including potentially data and voice communication applications for example, will normally be installed on user equipment 2000 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the user equipment such as, but not limited to, e-mail, messages, calendar events, voice mails, appointments, and task items. Further applications, including productivity applications, social media applications, games, among others, may also be loaded onto the user equipment 2000 through the network 2019, an auxiliary I/O subsystem 2028, serial port 2030, short-range communications subsystem 2040 or any other suitable subsystem 2042, and installed by a user in the RAM 2026 or a non-volatile store (not shown) for execution by the processor 2038. Such flexibility in application installation increases the functionality of the device and may provide enhanced on-device functions, communication-related functions, or both.

In a data communication mode, a received signal such as a text message or web page download will be processed by the communication subsystem 2011 and input to the processor 2038, which may further process the received signal for output to the display 2022, or alternatively to an auxiliary I/O device 2028.

A user of user equipment 2000 may also compose data items such as messages for example, using the keyboard 2032, which may be a complete alphanumeric keyboard or telephone-type keypad, either physical or virtual, among others, in conjunction with the display 2022 and possibly an auxiliary I/O device 2028. Such composed items may then be transmitted over a communication network through the communication subsystem 2011.

Where voice communications are provided, overall operation of user equipment 2000 is similar, except that received signals may typically be output to a speaker 2034 and signals for transmission may be generated by a microphone 2036. Alternative voice or audio I/O subsystems, such as a voice message recording subsystem, may also be implemented on user equipment 2000. Although voice or audio signal output is preferably accomplished primarily through the speaker 2034, display 2022 may also be used to provide an indication of the identity of a calling party, the duration of a voice call, or other voice call related information for example.

Serial port 2030 in FIG. 20 may be implemented in a user equipment for which synchronization with a user's desktop computer (not shown) may be desirable, but is an optional device component. Such a port 2030 may enable a user to set preferences through an external device or software application and may extend the capabilities of user equipment 2000 by providing for information or software downloads to user equipment 2000 other than through a wireless communication network. As will be appreciated by those skilled in the art, serial port 2030 can further be used to connect the user equipment to a computer to act as a modem or for charging a battery on the user equipment.

Other communications subsystems 2040, such as a short-range communications subsystem, is a further component which may provide for communication between user equipment 2000 and different systems or devices, which need not necessarily be similar devices. For example, the subsystem 2040 may include an infrared device and associated circuits and components or a Bluetooth™ or Bluetooth™ Low Energy communication module to provide for communication with similarly enabled systems and devices. Subsystem 2040 may further include a WUR radio. Subsystem 2040 may further include a DSRC radio. Subsystem 2040 may further include non-cellular communications such as Wi-Fi or WiMAX, or near field communications, and in accordance with the embodiments above such radio may be capable of being split in some circumstances.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a signal software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps are not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide may provide communication to an electronic device. For example, rather than a typical server response, the server may also provision or indicate a data for content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly a plurality of nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A method for Internet Protocol (IP) Multimedia Subsystem (IMS) communication registration through a relay user equipment, the method comprising:
receiving, at the relay user equipment from a remote user equipment, an association message, the association message containing a remote user equipment identifier; and
responsive to the receiving, sending a registration message from the relay user equipment to a network node of an IMS, the IMS being selected from a visited IMS of the relay user equipment or a home IMS of the relay user equipment, the registration message including an indication that the registration message is for the remote user equipment;
wherein the registration message comprises an IP address of the relay user equipment; and
wherein the registration message comprises an International Mobile Equipment Identifier (IMEI) of the relay user equipment, and an IMEI of the remote user equipment.

2. The method of claim 1, wherein the association message is a SIP REGISTRATION.

3. The method of claim 1, wherein the registration message includes one or more indications, the one or more indications being selected from a group of indications comprising: a relay user equipment identifier; an indication that the relay user equipment is acting as a relay; the remote user equipment identifier; and an application server identifier.

4. The method of claim 3, wherein the network node provides functionality for at least one of a Serving Call Session Control Function; a Proxy Call Session Control Function; an Interrogating Call Session Control Function; or an Application Server.

5. The method of claim 3, wherein the one or more indications are provided in feature tags.

6. The method of claim 1, further comprising receiving, at the relay user equipment, a subscription message from the network node, the subscription message requesting notification of a change in status of a resource on the relay user equipment.

7. The method of claim 1, further comprising, upon receiving the association message, providing a response to the remote user equipment, the response providing information to allow the remote user equipment to perform a further registration with a network node associated with the remote user equipment.

8. The method of claim 7, wherein the information provided in the response includes one or more of an identifier for the relay user equipment, capabilities of the relay user equipment, and an application server identifier.

9. The method of claim 8, wherein the capabilities include one or more indications selected from a group of indications comprising: microphone availability; speakers availability; video availability; and audio availability.

10. The method of claim 8, wherein the application server identifier identifies a resource manager and can include an identifier selected from the group of: a fully qualified domain name; a uniform resource identifier; a uniform resource name; and an IP address.

11. A relay user equipment for Internet Protocol (IP) Multimedia Subsystem (IMS) communication registration, the relay user equipment comprising:
a processor; and
a communications subsystem,
wherein the relay user equipment is configured to:
receive, from a remote user equipment, an association message, the association message containing a remote user equipment identifier; and
responsive to receiving the association message, sending a registration message from the relay user equipment to a network node of an IMS, the IMS being selected from a visited IMS of the relay user equipment or a home IMS of the relay user equipment, the registration message including an indication that the registration message is for the remote user equipment;
wherein the registration message comprises an IP address of the relay user equipment; and
wherein the registration messages comprises an International Mobile Equipment Identifier (IMEI) of the relay user equipment, and an IMEI of the remote user equipment.

12. The relay user equipment of claim 11, wherein the association message is a SIP REGISTRATION.

13. The relay user equipment of claim 11, wherein the registration message includes one or more indications, the one or more indications being selected from a group of indications comprising: a relay user equipment identifier; an indication that the relay user equipment is acting as a relay; the remote user equipment identifier; and an application server identifier.

14. The relay user equipment of claim 13, wherein the network node provides functionality for at least one of a Serving Call Session Control Function; a Proxy Call Session Control Function; an Interrogating Call Session Control Function; and an Application Server.

15. The relay user equipment of claim 13, wherein the one or more indications are provided in feature tags.

16. The relay user equipment of claim 11, wherein the relay user equipment is further configured to receive a subscription message from the network node, the subscription message requesting notification of a change in status of a resource on the relay user equipment.

17. The relay user equipment of claim 11, wherein the relay user equipment is further configured to, upon receiving the association message, provide a response to the remote user equipment, the response providing information to allow the remote user equipment to perform a further registration with a network node associated with the remote user equipment.

18. The relay user equipment of claim 17, wherein the information provided in the response includes one or more of an identifier for the relay user equipment, capabilities of the relay user equipment, and an application server identifier.

19. The relay user equipment of claim 18, wherein the capabilities include one or more indications selected from a group of indications comprising: microphone availability; speakers availability; video availability; and audio availability.

20. The relay user equipment of claim 18, wherein the application server identifier identifies a resource manager and can include an identifier selected from the group of: a fully qualified domain name; a uniform resource identifier; a uniform resource name; and an IP address.

21. A non-transitory computer readable medium for storing instruction code, which when executed by a processor of a relay user equipment for Internet Protocol (IP) Multimedia Subsystem (IMS) communication registration cause the relay user equipment to:
receive, from a remote user equipment, an association message, the association message containing a remote user equipment identifier; and
responsive to receiving the association message, send a registration message from the relay user equipment to a network node of an IMS, the IMS being selected from a visited IMS of the relay user equipment or a home IMS of the relay user equipment, the registration message including an indication that the registration message is for the remote user equipment;
wherein the registration message comprises an IP address of the relay user equipment; and
wherein the registration message comprises an International Mobile Equipment Identifier (IMEI) of the relay user equipment, and an IMEI of the remote user equipment.

* * * * *